(12) United States Patent
Al-Saggaf et al.

(10) Patent No.: US 11,307,540 B1
(45) Date of Patent: Apr. 19, 2022

(54) METHOD OF LINEAR ACTIVE DISTURBANCE REJECTION CONTROL WITH A FRACTIONAL ORDER INTEGRAL ACTION

(71) Applicant: King Abdulaziz University, Jeddah (SA)

(72) Inventors: Ubaid M. Al-Saggaf, Jeddah (SA); Abdulrahman U. Alsaggaf, Jeddah (SA); Muhammad Moinuddin, Jeddah (SA); Maamar Bettayeb, Sharjah (AE); Rachid Mansouri, Tizi Ouzou (DZ)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/412,562

(22) Filed: Aug. 26, 2021

(51) Int. Cl.
*G05B 11/40* (2006.01)
*G05B 6/02* (2006.01)
*G05B 11/42* (2006.01)

(52) U.S. Cl.
CPC ............... *G05B 11/40* (2013.01); *G05B 6/02* (2013.01); *G05B 11/42* (2013.01)

(58) Field of Classification Search
CPC .................................. G05B 6/02; G05B 11/42
See application file for complete search history.

(56) References Cited

U.S. PATENT DOCUMENTS

| | | | | |
|---|---|---|---|---|
| 6,142,026 | A * | 11/2000 | Ohashi | B60C 23/061 701/37 |
| 2009/0005886 | A1 * | 1/2009 | Gao | G06F 17/10 700/29 |

(Continued)

FOREIGN PATENT DOCUMENTS

CN 110554603 A 12/2019

OTHER PUBLICATIONS

Gao, et al. ; Fractional-Order Proportional-Integral-Derivative Linear Active Disturbance Rejection Control Design and Parameter Optimization for Hypersonic Vehicles with Actuator Faults ; Tsinghua Science and Technology vol., Issue 1 ; 16 Pages.

Gao, et al. ; Extended state observer-based fractional order proportional-integral-derivative controller for a novel electro-hydraulic servo system with iso-actuation balancing and positioning ; Advances in Mechanical Engineering, vol. 7(12) ; Nov. 5, 2015 ; 11 Pages.

(Continued)

*Primary Examiner* — Rina I Duda
(74) *Attorney, Agent, or Firm* — Oblon, McClelland, Maier & Neustadt, L.L.P.

(57) ABSTRACT

A method, system, and apparatus for a linear active disturbance rejection control with a fractional order integral (FOI-LADRC) action for set-point tracking of a process variable is disclosed. The FOI-LADRC method includes receiving and multiplying a reference signal by a first feedback signal, applying, by a set-point tracking controller, fractional order integration to the reference signal, amplifying and multiplying the reference signal by a series of second feedback signals and a third feedback signal, dividing the reference signal by a static gain, and generating a process control variable, inputting the process control variable and applying a disturbance to the plant to output an output signal, feeding back the output signal, as the first feedback signal, generating the series of second feedback signals and a third feedback signal by an extended state observer, ESO, and tuning the set-point tracking controller and the ESO to eliminate the disturbance, from the output signal.

20 Claims, 25 Drawing Sheets

(56) References Cited

U.S. PATENT DOCUMENTS

2009/0143871 A1* 6/2009 Gao ............... G05B 13/04
 700/29
2016/0033944 A1* 2/2016 El-Shaer ............ G05B 19/416
 700/37

OTHER PUBLICATIONS

Yang, et al. ; Fractional order PD controller based on ADRC algorithm for DC motor ; 2014 IEEE Conference and Expo Transportation Electrification Asia-Pacific ; Nov. 3, 2014 ; Abstract Only ;1 Page.

* cited by examiner

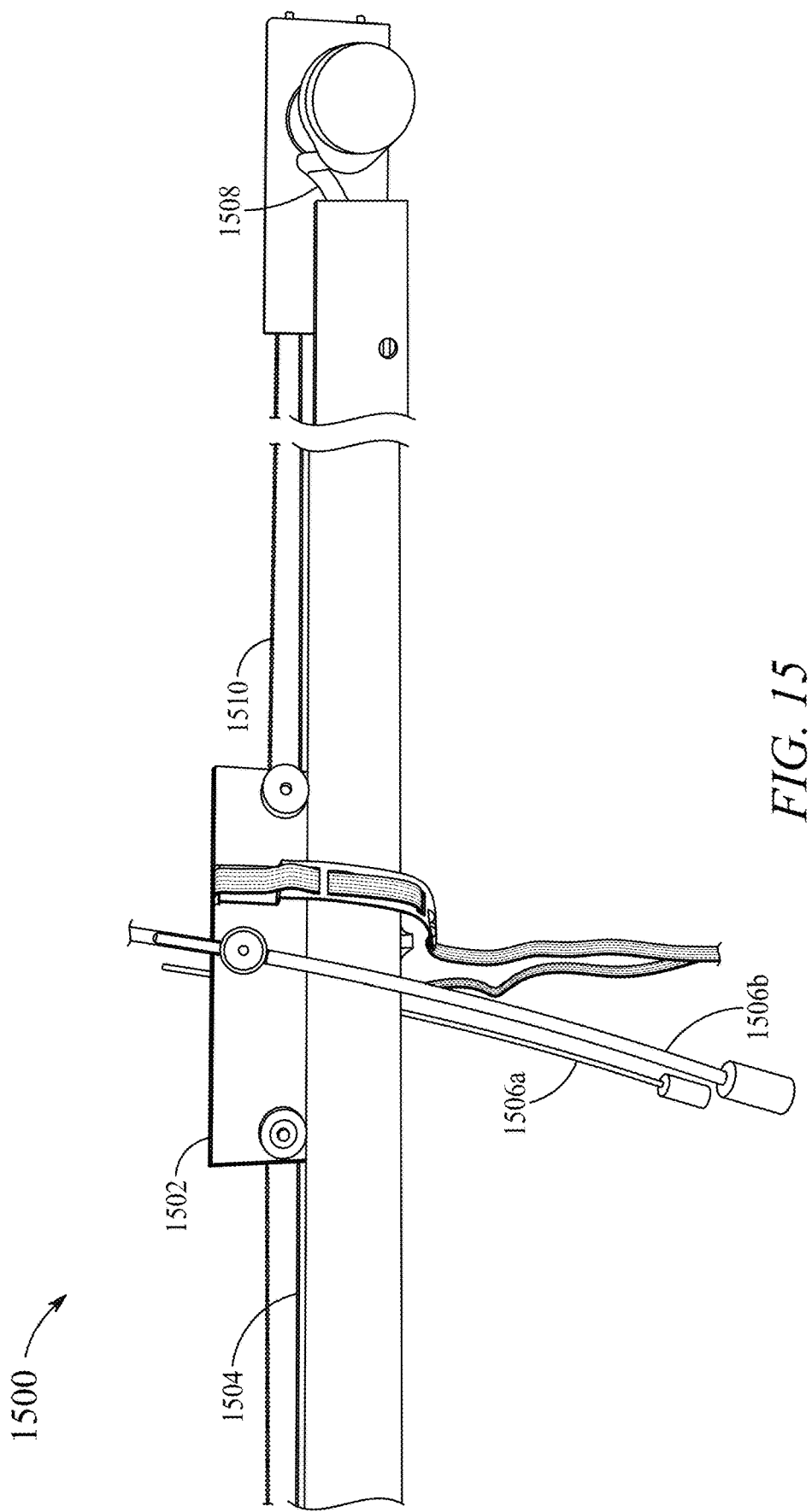

METHOD OF LINEAR ACTIVE DISTURBANCE REJECTION CONTROL WITH A FRACTIONAL ORDER INTEGRAL ACTION

STATEMENT OF ACKNOWLEDGEMENT

The inventors extend their appreciation to the Deputyship for Research and Innovation, Ministry of Education in Saudi Arabia for funding this research work through the project number 2020-082 and King Abdulaziz University, DSR, Jeddah, Saudi Arabia.

BACKGROUND

Technical Field

The present disclosure is directed to a method, system, and an apparatus for a linear active disturbance rejection control with a fractional order integral action.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Fractional calculus has applications in a number of science and engineering fields, such as signal processing and control systems. Further, many naturally existing processes, such as charging and discharging of lossy capacitors, flow of fluid in a porous media, conduction of heat in a semi-infinite slab, voltage-current relation in a semi-infinite transmission line, and non-Fickian diffusion, can be more accurately modeled using fractional order differential equations.

Fractional order controllers, for example, a proportional-integral-derivative fractional order filter (PID-FOF) controller, are used to control integer and fractional order systems, as the closed-loop response of the PID-FOF controllers is more accurate than that of a classical PID control system. Researchers have shown interest in developing effective tuning techniques for non-integer order controllers and new control schemes based on fractional order controllers As plant uncertainties and internal/external disturbances are unknown, new control schemes have been proposed for industrial control systems. Several data-driven or model-free design techniques have been proposed to overcome the plant uncertainties and internal/external disturbances, for example, an active disturbance rejection controller (ADRC) (See: U.S. Pat. No. 8,644,963, incorporated herein by reference in its entirety). The ADRC takes into consideration both the unknown unmodeled dynamics, also called internal disturbance, and the external perturbation as general disturbances, and actively rejects them. A well-tuned state feedback control is then used to solve a set point tracking problem of a controller. However, the ADRC controller lacks robustness and dynamic performance hindering its adoption.

Accordingly, it is one object of the present disclosure to provide methods, systems and an apparatus for a linear active disturbance rejection controller with fractional order integral action (LADRC-FOI).

SUMMARY

In an exemplary embodiment, a fractional order integral linear active disturbance rejection control (FOI-LADRC) method for set-point tracking of a process variable is disclosed. The FOI-LADRC method includes receiving, at a first multiplier, a reference signal, r(t), multiplying, by the first multiplier, the reference signal by a first feedback signal and generating a feedback modified reference signal, $\varepsilon(t)$, dividing, by a set-point tracking controller including a fractional order integrator, the feedback modified reference signal, $\varepsilon(t)$, by a fractional order integral operator, and generating a fractional order reference signal, $Z_r(t)$, amplifying, by a first amplifier of the set-point tracking controller, the fractional order reference signal, $Z_r$, by a first integrated gain, $k_r$, to generate a gain modified fractional order reference signal, $Z'_r(t)$, multiplying, by a second multiplier, the gain modified fractional order reference signal, $Z'_r(t)$ by a series of second feedback signals and generating a modified signal, $u_0(t)$, multiplying, by a third multiplier, the modified signal, $u_0(t)$ by a third feedback signal and generating a feedback modified signal, $u'_0(t)$, dividing, by a second amplifier, the feedback modified signal, $u'_0(t)$, by a static gain, $b_0$, and generating a process control variable, $u(t)$, inputting the process control variable, $u(t)$, to a plant, applying a disturbance, d, to the plant, outputting, by the plant, an output signal, $y(t)$, feeding back the output signal, $y(t)$, as the first feedback signal to the first multiplier, inputting the output signal, $y(t)$, and the process control variable, $u(t)$, to an extended state observer, ESO, wherein the ESO is configured to estimate the disturbance, d, generating, by the ESO, a series of n estimated disturbance canceling feedback signals, $Z_1(t), Z_2(t), \ldots Z_n(t)$ multiplying, by a third amplifier, the series of n estimated disturbance canceling feedback signals by a state feedback vector, $K_S$, to generate the series of second feedback signals, $K_S Z_1(t), K_S Z_2(t), \ldots K_S Z_n(t)$, generating, by the ESO, a third feedback signal, $Z_{n+1}(t)$, based on an estimate of the process variable, $u(t)$, and tuning the set-point tracking controller and the ESO to eliminate the disturbance, d, from the output signal, $y(t)$.

In another exemplary embodiment, a set point tracking system with fractional order integral linear active disturbance rejection control is disclosed. The set point tracking system with fractional order integral linear active disturbance rejection control includes a first multiplier having an input configured to receive a reference signal, r(t) and a first negative feedback signal and generate a feedback modified reference signal, $\varepsilon(t)$, a set point tracking controller connected to the first multiplier, the set point tracking controller includes a first circuitry and a first processor having first program instructions to perform fractional order integration by applying a fractional order integral operator to the feedback modified reference signal, $\varepsilon(t)$, to generate a fractional order reference signal, $Z_r(t)$, a first amplifier configured to amplify the fractional order reference signal, $Z_r$, by a first integrated gain, $k_r$, to generate a gain modified fractional order reference signal, $Z'_r(t)$, a second multiplier connected to the set point tracking controller, the second multiplier configured to multiply the gain modified fractional order reference signal, $Z'_r(t)$ by a series of second negative feedback signals to generate a modified signal, $u'_0(t)$, a third multiplier connected to the second multiplier, the third multiplier configured to multiple the modified signal, $u'_0(t)$, by a third negative feedback signal to generate a feedback modified signal, $u_0(t)$, a second amplifier connected to the third multiplier, the second amplifier configured to divide the feedback modified signal, $u_0(t)$ by a static gain, $b_0$, to generate a process control variable, u(t), a plant connected to the second amplifier, the plant having a first input configured to receive the process control variable, u(t), a second input configured to receive a disturbance, d, and an output configured to generate an output signal, y(t), an extended state observer, ESO, controller having a first input connected to the output signal, y(t), and a second input connected to the process variable, u(t), the ESO controller includes second circuitry and a second processor having second program instructions configured to estimate the disturbance, d, generate a series of n estimated disturbance canceling feedback signals, $Z_1(t), Z_2(t), \ldots Z_n(t)$, generate a third negative feedback signal, $Z_{n+1}(t)$, based on an estimate of the process variable, u(t), a third amplifier having an input connected to receive the series of n estimated disturbance canceling feedback signals, $Z_1(t), Z_2(t), \ldots Z_n(t)$ and multiply the series of n estimated disturbance canceling feedback signals, $Z_1(t), Z_2(t), \ldots Z_n(t)$ by a state feedback vector, $K_S$, to generate the series of second negative feedback signals, $K_S Z_1(t), K_S Z_2(t), \ldots K_S Z_n(t)$, a first control input configured for tuning the set-point tracking controller, and a second control input configured for tuning the ESO, wherein tuning the set-point tracking controller and the ESO is configured to eliminate the disturbance, d, from the output signal, y(t).

In another exemplary embodiment, a fractional order integral linear active disturbance rejection control method for set-point tracking of a process variable is disclosed. The fractional order integral linear active disturbance rejection control method for set-point tracking of a process variable includes receiving, at a first multiplier, a reference signal, multiplying the reference signal by a first feedback signal, applying, by a set-point tracking controller, fractional order integration to the reference signal, amplifying the reference signal, multiplying the reference signal by a series of second feedback signals and a third feedback signal, dividing the reference signal by a static gain, $b_0$, and generating a process control variable, u(t), inputting the process control variable, u(t), to a plant, applying a disturbance, d, to the plant, outputting, by the plant, an output signal, y(t), feeding back the output signal, y(t), as the first feedback signal, generating the series of second feedback signals and a third feedback signal by an extended state observer, and tuning the set-point tracking controller and the ESO to eliminate the disturbance, d, from the output signal, y(t).

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 15 is an example experimental testbed of a cart-pendulum system, according to certain embodiments.

DETAILED DESCRIPTION

Figure 1:
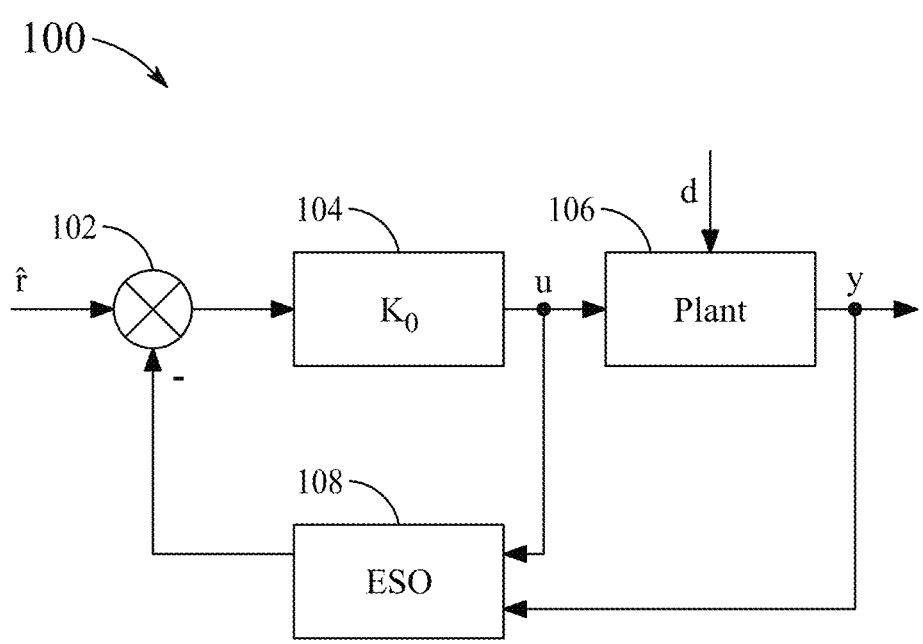
FIG. 1 is a block diagram of a conventional linear active disturbance rejection control (LADRC) system including a feedback control loop having an extended order observer, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to methods and system for linear active disturbance rejection control with a fractional order integral action.

FIG. 1 illustrates a conventional linear active disturbance rejection control (LADRC) system 100 including a feedback control loop having an extended order observer, ESO 108. The LADRC system 100 comprises an amplifier 104 with a gain, $K_0$, a plant (or a system) 106 to be controlled, and the extended state observer (ESO) 108. The LADRC system 100 further includes a multiplier 102 in a forward path of a closed loop of the LADRC system 100. The amplifier 104 is a component having a gain ($K_0$) configured to amplify an input signal. The plant 106 may be a circuitry, machinery or a system experiencing disturbances that are to be controlled. The ESO 108 is configured to estimate and cancel the disturbances.

In operation, an input signal, $\hat{r}$, is input to the multiplier 102. The multiplier 102 also receives a negative feedback input, z, from the ESO 108. The amplifier 104 with an amplifier gain, $K_0$, amplifies a resultant signal obtained from the multiplier 102 to generate a signal, u. The signal, u, is input to the plant 106. The signal, u, is affected by a disturbance, d, in the plant 106 operation. The plant 106 generates an output signal, y.

The output signal, y, and the signal, u, are input to the ESO 108. The ESO 108 estimates a generalized disturbance which may include one or more of external disturbances including, the disturbance, d, unknown internal dynamics of the LADRC system 100 and uncertainty in the gain of the LADRC system 100. In one example, the generalized disturbance may be referred to as any or all unknowns in a controlled process, such as an unknown process model and disturbances. Such generalized disturbances are estimated as a negative feedback input, which is input to the multiplier 102, to cancel the generalized disturbance.

The LADRC system 100 and the plant 106 to be controlled may be modeled by:

$$\begin{cases} y^{(n)}(t) = b_0 u(t) + f(t) \\ f(t) = f(t, y^{(i)}, u^{(i)}, d^{(i)}, d) + (b - b_0)u(t) \end{cases} \quad (1)$$

where:
$y^{(n)}(t)$ is the $n^{th}$ derivative of y(t), u(t), and y(t) are an input and an output, respectively, 'n' is a relative degree, '$b_0$' is an estimate value of gain b, and f(t) is a generalized disturbance, $y^{(i)}$, $u^{(i)}$ and $d^{(i)}$ are the $i^{th}$ derivative of u(t), y(t) and d(t), respectively (See: Han, J. (1998). "Active disturbance rejection controller and its applications". Control Decision, 13(1), pp. 19-23; Han, J. (2009); "From PID to active disturbance rejection control". IEEE Trans. Ind. Electron., 56(3), pp. 900-906; Gao, Z. (2006); "Active disturbance rejection control: A paradigm shift in feedback control system design", Proceedings of the 2006 American control conference, p. 7 pp; each incorporated herein by reference in its entirety).

In the conventional LADRC system 100, the unknown generalized disturbance f(t) is estimated the ESO 108. Assuming that f(t) is differentiable, an extended state space model corresponding to (1) is provided by:

$$\text{System: } \begin{cases} \dot{x} = Ax + Bu + Eh \\ y = Cx \end{cases} \quad (2)$$

where:

$$x_s = [y \; \dot{y} \; \ldots \; y^{(n-1)}]^T, x = [x_s^T], h = \dot{f},$$

$$A = \begin{bmatrix} 0 & 1 & 0 & \cdots & 0 \\ 0 & 0 & 1 & \cdots & 0 \\ \vdots & \vdots & \vdots & \ddots & \vdots \\ 0 & 0 & 0 & \cdots & 1 \\ 0 & 0 & 0 & \cdots & 0 \end{bmatrix}, B = \begin{bmatrix} 0 \\ 0 \\ \vdots \\ b_0 \\ 0 \end{bmatrix}, E = \begin{bmatrix} 0 \\ 0 \\ \vdots \\ 0 \\ 1 \end{bmatrix}, \text{ and } C = [1 \; 0 \; 0 \; \ldots \; 0].$$

The ESO 108 is given by:

$$ESO : \begin{cases} \dot{z} = Az + Bu + L(y - y_0) \\ y_0 = Cz \end{cases} \quad (3)$$

where $z_s$ is the estimate of $x_s$, $z_{n+1}$ is the estimate of $f(t)$, and L is a gain vector of the ESO. The gain vector L of the ESO 108 is given by:

$$L = [\beta_1 \beta_2 \ldots \beta_n \beta_{n+1}] \quad (4)$$

The parameters $\beta_i$, (i=1, n+1) are determined so that (A–LC) is asymptotically stable. In this case, variables $z_i(t)$ (i=1, ..., n) approximate the output y(t) and its (n−1) derivatives, and $z_{n+1}(t)$ approximates the unknown generalized disturbance f(t). To reject the estimated disturbance, a control law is chosen as:

$$u(t) = \frac{u_0(t) - z_{n+1}(t)}{b_0}. \quad (5)$$

If an estimated error is ignored, that is, if it is assumed that $z_{n+1}(t) = f(t)$, then the equation (1) is reduced to n cascaded integer-order integral operators, which is:

$$y^n(t) = u_0(t) \quad (6)$$

In the conventional form, a state feedback is used to solve a set-point tracking (SPT) problem. Thus, the control law u(t) is given by:

$$u(t) = K_0(\hat{r}(t) - z(t)) \quad (7)$$

where $\hat{r}(t)$ is the new reference signal obtained from the reference signal r(t) and its (n−1) derivatives.

$$\hat{r}(t) = [r(t) \dot{r}(t) \ldots r^{(p-1)}(t) 0]^T \quad (8)$$

and $$K_0 = \frac{1}{b_0}[k_1 \; k_2 \; \ldots \; k_n \; 1] \quad (9)$$

The structure of the conventional LADRC shown in FIG. 1 has two gain vectors to be designed: the gain L of the ESO, and the gain $K_0$ of the controller. The gain vectors may be designed using two parameters: a controller bandwidth, $\omega_c$, and an observer bandwidth $\omega_0$, from known techniques.

Figure 2:
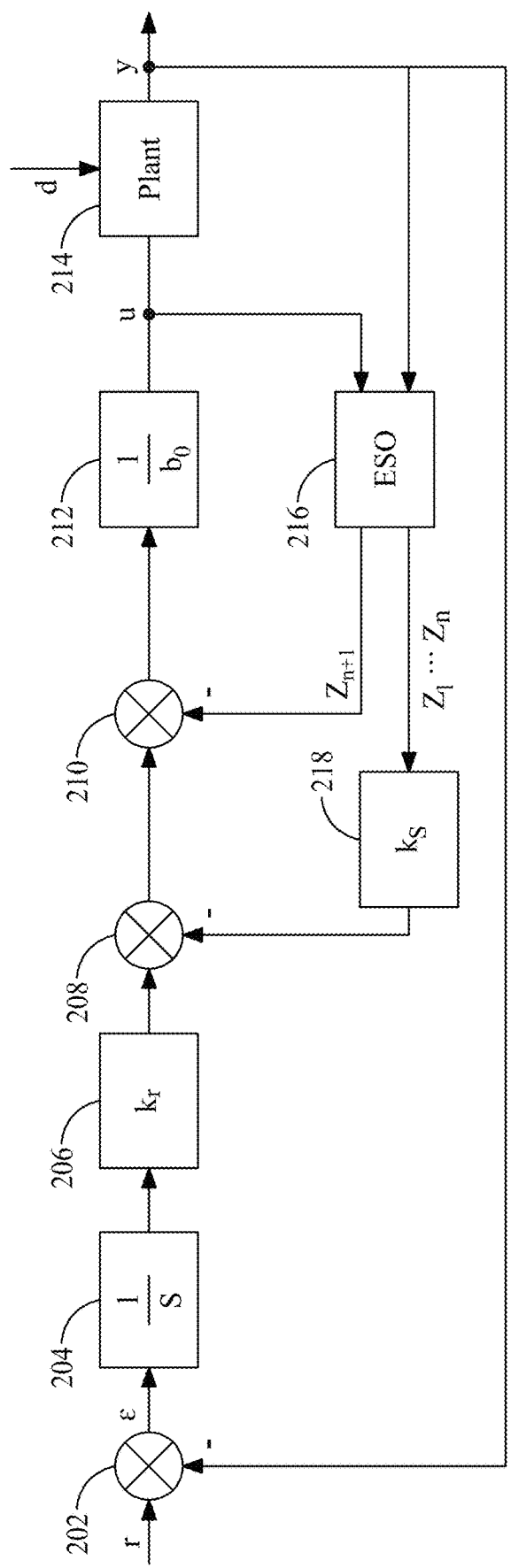
FIG. 2 is a block diagram of a conventional linear active disturbance rejection control (LADRC) system with integer order integral control, according to certain embodiments.

To improve a performance of the conventional LADRC for uncertain systems, specifically with respect to external disturbances, a control technique associating a LADRC with an integer order integral (IOI) action has been used (also referred to as IOI-LADRC) (See: Nie, Z. Y., Ma, Y. J., Wang, Q. G., and Guo, D. (2018). "Guaranteed-cost active disturbance rejection control for uncertain systems with an integral controller". In: International Journal of Systems Science 49(9), pp. 2012-2024, incorporated herein by reference in its entirety). The IOI-LADRC system 200 is shown in FIG. 2 having a multiplier 202 in a forward path of a closed loop of the IOI-LADRC system 200. An amplifier 204 with a gain, 1/S, and an amplifier 206 with a gain, $k_r$, are configured to amplify the input signal. A multiplier 208 multiplies the amplified signal with feedback signal from an ESO 216. A multiplier 210 further multiplies the multiplied signal with another feedback signal from an ESO 216. An amplifier 212 with a gain, $1/b_0$, further amplifies the multiplied signal, and generates a signal, u. The signal, u, is input to the plant 214. The signal, u, is affected by a disturbance, d, due to non-linearity in the plant 214 operation. The plant 214 generates an output signal, y. The output signal, y, and the signal, u, are input to the ESO 216. The ESO 216 is configured to estimate and cancel the disturbances. The ESO 216 estimates a generalized disturbance which may include one or more of external disturbances including, the disturbance, d, unknown internal dynamics of the IOI-LADRC system 200 and uncertainty in the gain of the IOI-LADRC system 200. For the IOI-LADRC system 200 has an additional state which is an integral of a set-point tracking error, given by:

$$x_r(t) = \int_0^t (r(\tau) - y(\tau)) d\tau, \quad (10)$$

where r(t) is the reference signal and y(t) is the output. The new state $x_r(t)$ denotes a tracking error, which is included in the control law. In this case, the control signal of equation (7) becomes:

$$u(t) = \frac{(k_r x_r(t) - k_s z_s(t) - z_{n+1}(t))}{b_0}, \quad (11)$$

where $K_s = [k_{s1} \; k_{s2} \; \ldots \; k_{sn}]$ and $k_r$ are the feedback gains of the observed variable and the added integration state, respectively. A pole placement technique may be used to design these parameters. Assuming that the observer is well designed, that is the system of equation (1) is transformed to n cascaded integrators of equation (6), the transfer function between r(s) and y(s) is provided by:

$$G_{yr}(s) = \frac{k_r}{s^{n+1} + k_{sn} s^n + k_{sn-1} s^{n-1} + \ldots + k_{s1} s + k_r}. \quad (12)$$

The transfer function is processed to arrive at:

$$G_{yr}(s) = \left(\frac{\omega_c}{s + \omega_c}\right)^{n+1}. \quad (13)$$

Thus, the controller parameters are tuned to:

$$[k_r k_{s1} \ldots k_{sn}] = [\omega_c^{n+1} \alpha_{n+1} \omega_c^n \alpha_n \ldots \omega_c \alpha_1], \quad (14)$$

$$\alpha_i = \frac{(n+1)!}{i!(n+1-i)!}, i = 1, \ldots n+1.$$

The conventional LADRC system (of FIG. 1) and IOI-LADRC system (of FIG. 2) suffer from lack of robustness and are not applicable to high order plant dynamics. Also, the systems lack capabilities to eliminate a steady error for changing disturbance or reference signal.

LADRC with fractional order integral action.

In an aspect, the present disclosure describes a LADRC scheme with fractional order integral action (FOI) (hereinafter referred to as FOI-LADRC) to significantly improve a robustness of the conventional LADRC. Using a robust closed-loop (CL) Bode's ideal transfer function (BITF), the disclosure describes an appropriate pole placement technique to design a set-point tracking controller of the FOI-LADRC scheme. The fractional order integral action is added in the feedback loop, leading to improvement in the disturbance rejection. Also, a steady error for changing disturbance or reference signal is eliminated as a result.

Bode's Ideal Transfer Function:

In the fractional order controllers design, a new degree of freedom introduced by the controller, that is, the non-integer order, is used so that at least one characteristic of the CL system depends on the non-integer order. In this case, the CL system depending on the non-integer order becomes insensitive to system or controller parameters changes. To address the insensitivity, one solution is to impose a behavior equivalent to that of BITF on the open-loop (OL). The OL transfer function suggested by Bode is given by:

$$G_{ol}(s) = \frac{1}{\tau_c s^{\lambda+1}}; \lambda \in \mathbb{R} \quad (15)$$

A gain crossover frequency depends on a time constant $\tau_c$ and the phase, which is a horizontal line, depends on the non-integer order $\lambda$. The corresponding CL transfer function is provided by:

$$G_{cl}(s) = \frac{1}{1 + \tau_c s^{\lambda+1}} \quad (16)$$

A step response of the transfer function (for $0<\lambda<1$) is equivalent to that of a second-order model for a damping ration is $(0<\zeta<1)$. However, the step response exhibits an iso-damping property. In some aspects, the adjustable parameters $\tau_c$ and $\lambda$ of $G_{cl}(s)$ are used for tuning the control law parameters.

When a relative degree of the second-order model is greater than 2, the SPT controller design becomes complex to obtain a transfer function equal to equation (15) in OL. To simplify the SPT controller design, a transfer function can be used as a new OL reference model. The transfer function is provided by:

$$G_{ol}(s) = \frac{1}{(1+Ts)^{n-1} \tau_c s^{\lambda+1}}. \quad (17)$$

A corresponding transfer function for CL is provided by:

$$G_{cl}(s) = \frac{1}{(1+Ts)^{n-1} \tau_c s^{\lambda+1} + 1}; \quad (18)$$

where n is the relative degree, $\tau_c$ and $\lambda$ are the design parameters of equation (15), T is an additional time constant that is to be chosen as small as possible according to $\tau_c$ so that dynamics the additional time constant generates does not modify the dynamics of the BITF imposed by the parameters $\tau_c$ and $\lambda$.

Figure 3A:
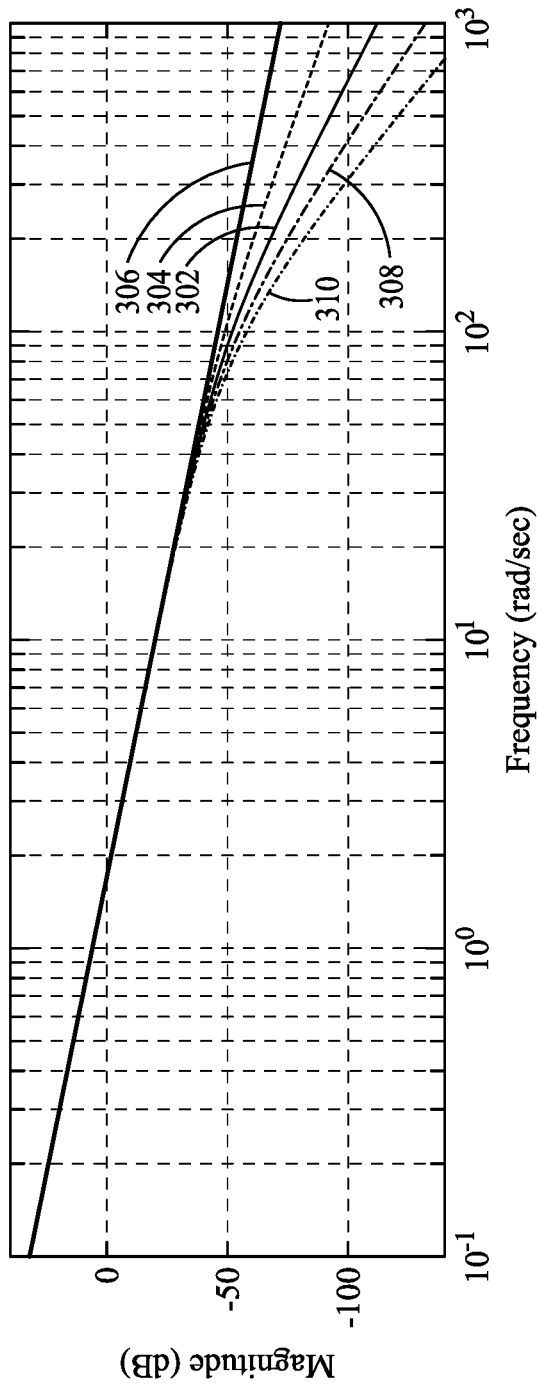
FIG. 3A illustrates a Bode diagram indicating a magnitude response corresponding to a transfer function for an open loop, according to certain embodiments.
Figure 3B:
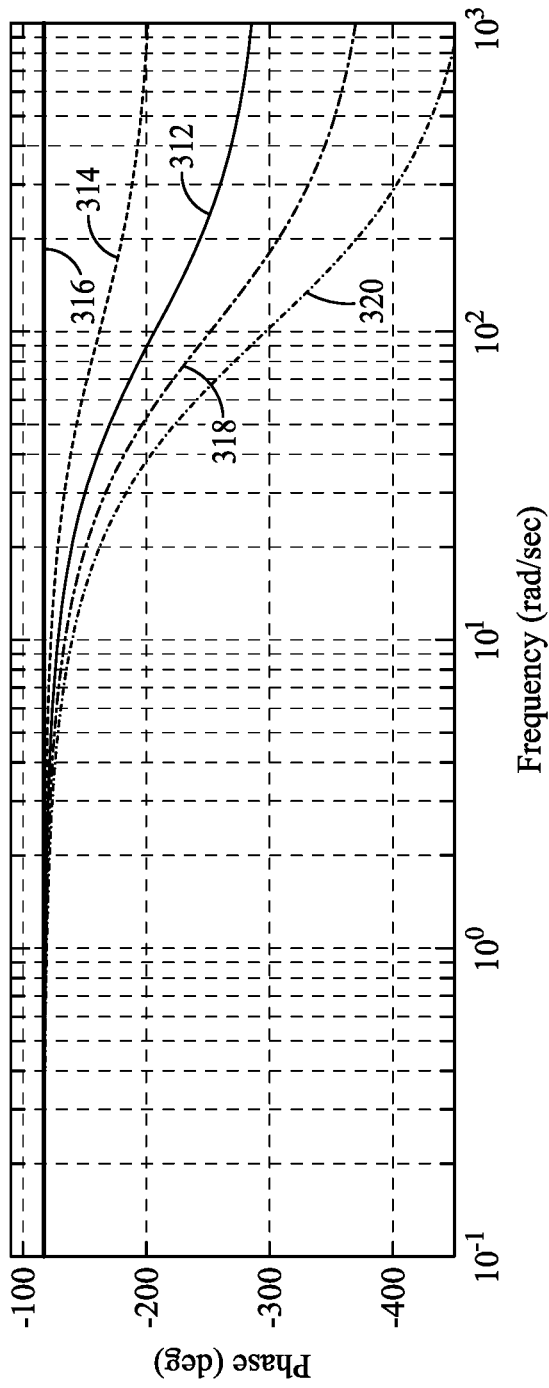
FIG. 3B illustrates a Bode diagram indicating a phase response corresponding to the transfer function for an open loop, according to certain embodiments.
Figure 4:
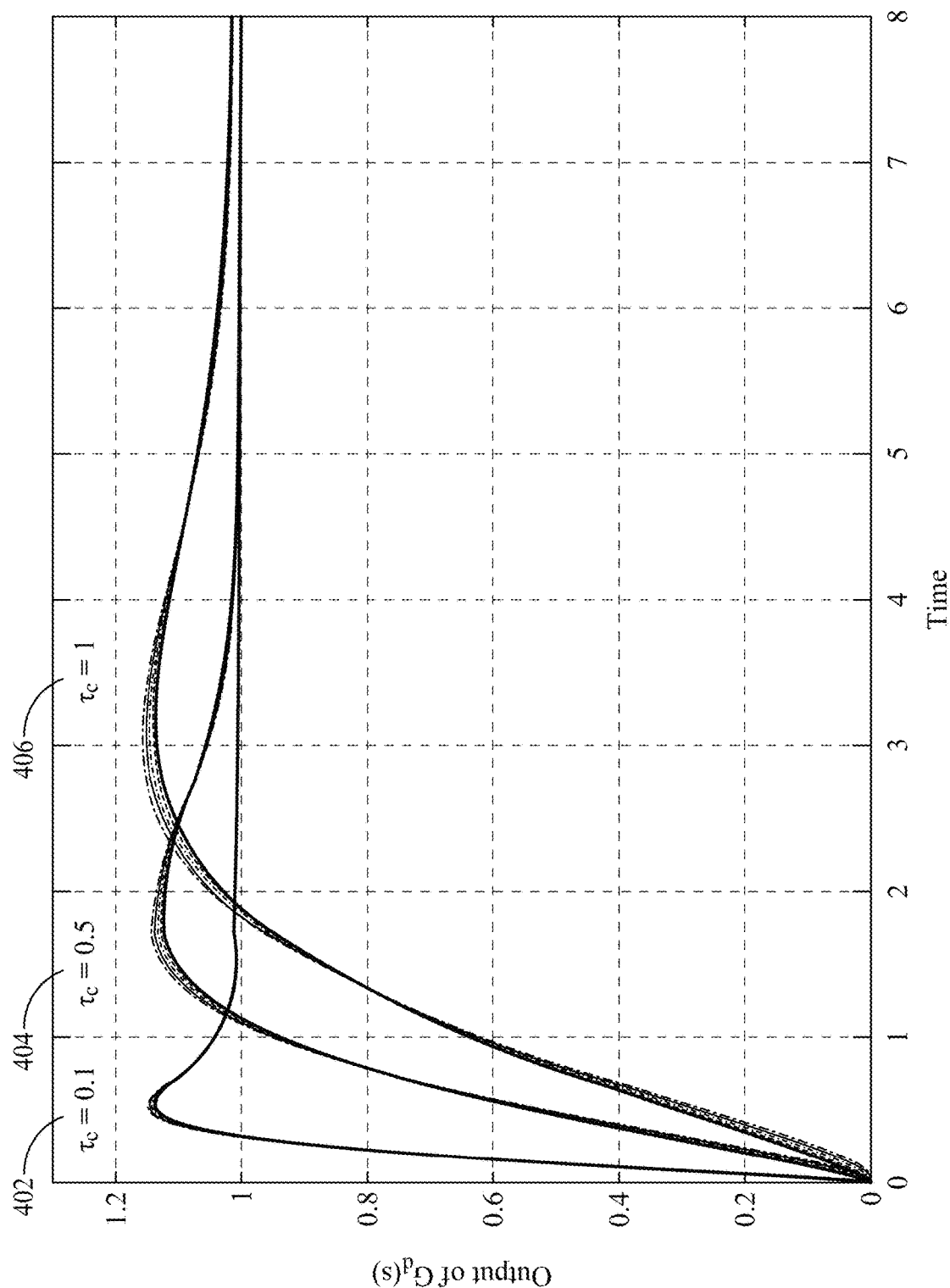
FIG. 4 illustrates a step response of a closed-loop (CL) corresponding to the transfer function, according to certain embodiments.

FIGS. 3A and 3B illustrate a Bode diagram corresponding to transfer function provided by Equation (17) for a non-limiting example where n=1, 2, 3, 4 when $\lambda$=0.3, $\tau_c$=0.5 and T=$\tau_c$/50. FIG. 3A illustrates magnitude responses 302-304 and 308-310 for n=1, 2, 3, 4 corresponding to the transfer function. FIG. 3B illustrates phase responses 312-314 and 318-320 for n=1, 2, 3, 4 corresponding to the transfer function. FIG. 4 illustrates step responses corresponding to the CL (shown in equation (18)) for three values of $\tau_c$ ($\tau_c$=0.1 402, $\tau_c$=0.5 404 and $\tau_c$=1 406). FIG. 3A, FIG. 3B and FIG. 4 demonstrate that the behavior of the transfer function as per equation (17) is substantially similar to that of Bode ITF corresponding to equation (15). FIG. 4, in particular, demonstrates an iso-damping property of the CL step response. To link with the conventional LADRC system, the SPT controller parameter design to $\omega_c$ is replaced by two parameters $\tau_c$ and $\lambda$, and $\omega_0$ is used for tuning the observer gain. In addition, the frequency corresponding to the time constant T is kept smaller than coo, for the observer to correctly estimate the generalized disturbance.

Figure 5:
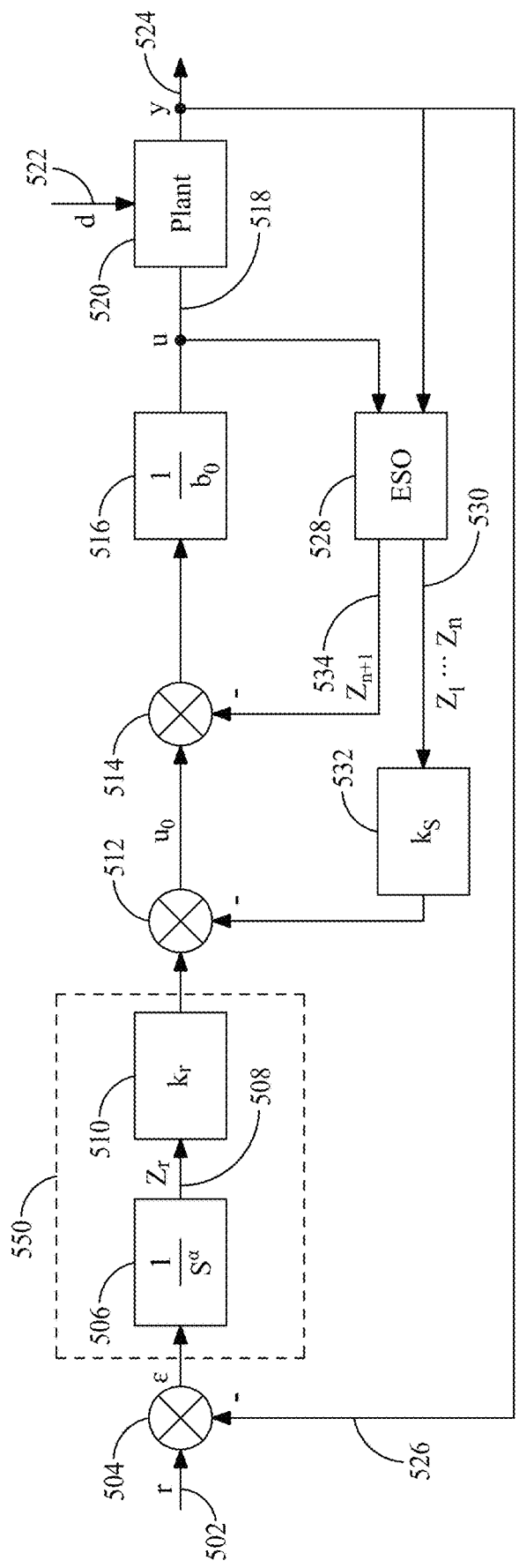
FIG. 5 is a block diagram of a system with a fractional order integral action (FOI-LADRC), according to certain embodiments.

LADRC with Fractional Order Integral Action (FOI-LADRC):

FIG. 5 illustrates a LADRC system with a fractional order integral action (FOI-LADRC), according to an embodiment. Construction of FOI-LADRC system design is substantially similar to LADRC system of FIG. 2 but additionally includes a feedback control loop having ESO 428, and state feedback $K_S$ 432 according to aspects of the disclosure. In an aspect, in the FOI-LADRC scheme, the state feedback $K_s$ allows arbitrary placement of n poles of CL characteristic polynomial. The state feedback $K_s$ is associated with the gain $k_r$ of the fractional integration to impose the BITF of equation (18) on the CL. Imposing the BITF increases the robustness of the LADRC structure with respect to the set-point OL gain. Thus, the control signal is given by:

$$u(t) = \frac{(k_r \mathfrak{I}_\alpha(r(t) - y(t)) - K_s z_s(t) - z_{n+1}(t)}{b_0}, \quad (19)$$

where $\mathfrak{I}_\alpha(.)$ denotes the fractional order integral operator.

Design of the state feedback vector $K_S$, the coefficient $k_r$, and the non-integer order $\alpha$ ($0<\alpha<1$) of the fractional order integrator of equation (19) when the CL reference model is of equation (18) is described. Considering the integer order model described in equation (1) representing a stable linear minimum phase system. The ESO as described in equation (3) is used to estimate the generalized disturbance $f(t)$ involved the integer order model of equation (1). The parameters of the FOI-LADRC of equation (19), which allows obtaining the reference model (18) in CL are given by:

$$\alpha = \lambda, \; k_r = \frac{1}{T^{n-1}\tau_c}, \quad (20)$$

$$K_s = \left[\frac{n-1}{T} \; \frac{(n-2)(n-1)}{2!T^2} \; \frac{(n-3)(n-2)(n-1)}{3!T^3} \; \cdots \; \frac{1}{T^{n-1}} 0\right]; \quad (21)$$

where $\lambda$, $\tau_c$ and T are the parameters of the CL reference model of equation (18) and n is the relative degree of the integer order model of equation (1).

Assuming that the extended observer is well designed, that is, $z_{n+1}(t)=f(t)$, the transfer function between $\varepsilon(s)$ and y(s) is given by:

$$\frac{y(s)}{\varepsilon(s)} = \frac{k_r}{\Delta_{OL}(s)s^\alpha}; \quad (22)$$

where $\Delta_{OL}(s)=s^n+k_{s1}s^{n-1}+k_{s2}s^{n-2}+\ldots k_{sn-1}s+k_{sn}$. (23)

To obtain the transfer function provided in equation (17) in OL, one pole of $\Delta_{OL}(s)$ is set to zero to combine the pole with the fractional order integrator to obtain the BITF of equation (19). Thus, to obtain the transfer function, $k_{sn}$ is set to zero:

$$k_{sn}=0. \quad (24)$$

In this case, the transfer function of equation (22) after dividing by $k_{n-1}$ becomes:

$$\frac{y(s)}{\varepsilon(s)} = \frac{k_r}{\frac{k_{sn-1}}{k_r}\Delta_{OL}(s)s^{\alpha+1}}, \quad (25)$$

and $\Delta_{OL}(s)$ becomes a $(n-1)^{th}$ order polynomial. The $\Delta_{OL}(s)$ is given by:

$$\Delta_{OL}(s) = \frac{1}{k_{sn-1}}s^{n-1} + \frac{k_{s1}}{k_{sn-1}}s^{n-2} + frack_{s2}k_{sn-1}s^{n-3} \ldots + \frac{k_{s1}n-2}{k_{sn-1}}s + 1. \quad (26)$$

To obtain a behavior equivalent to that of the BITF in the OL, the transfer function of the equation (25) has to be in the form of the transfer function provided in the equation (17). To achieve this behavior, the parameters are set by:

$$\alpha = \lambda, \frac{k_{sn-1}}{k_r} = \tau_c. \quad (27)$$

Using Newton's binomial formula:

$$(1+T_s)^{n-1} = \Sigma_{k=0}^{n-1}\binom{n-1}{k}(T_s)^k. \quad (28)$$

A term by term identification of the coefficients of (28) and those of the integer order denominator of the transfer function (26), leads to:

$$k_{s1} = \frac{n-1}{T}, \quad (29)$$

$$k_{s2} = \frac{(n-2)(n-1)}{2!\,T^2},$$

$$k_{s3} = \frac{(n-3)(n-2)(n-1)}{3!\,T^3}, \ldots$$

$$k_{sn-4} = \frac{(n-3)(n-2)(n-1)}{3!\,T^{n-4}},$$

$$k_{sn-3} = \frac{(n-2)(n-1)}{2!\,T^{n-3}},$$

$$k_{sn-2} = \frac{n-1}{T^{n-2}},$$

$$k_{sn-1} = \frac{1}{T^{n-1}};$$

Substituting the expression $k_{sn-1}$ into equation (27), $k_r$ is deduced to:

$$k_r = \frac{1}{T^{n-1}\tau_c}. \quad (30)$$

Derivation of equation (30) demonstrates a proof that parameters defined in equation (20) allow obtaining the reference model of equation (18) in CL.

FIG. 5 illustrates the FOI-LADRC system for controlling a device, such as a plant, servo system or moving device, and the like, according to exemplary aspects of the present disclosure.

In operation, a reference signal, r(t) 502 is input to a first multiplier 504. The first multiplier 504 multiples reference signal, r(t) with a first feedback signal 526 to generate a feedback modified reference signal, $\varepsilon(t)$. A fractional order integrator 506 of a set-point tracking controller 550 divides the feedback modified reference signal, $\varepsilon(t)$ to generate a fractional order reference signal, $Z_r(t)$. A first amplifier 510 of the set-point tracking controller 550 amplifies the fractional order reference signal, $Z_r$, by a first integrated gain, $k_r$, to generate a gain modified fractional order reference signal, $Z'_r(t)$. A second multiplier 512 multiplies the gain modified fractional order reference signal, $Z'_r(t)$ by a series of second feedback signals and generates a modified signal, $u_0(t)$. A third multiplier 514 multiplies the modified signal, $u_0(t)$ by a third feedback signal and generating a feedback modified signal, $u'_0(t)$. A second amplifier 516 divides the feedback modified signal, $u'_0(t)$, by a static gain, $b_0$, and generates a process control variable, u(t) 518. The process control variable, u(t) 518 is input to a plant 520. A disturbance, d 522, is applied to the plant 520. The plant 520 outputs an output signal, y(t) 524. The first multiplier 504 receives the output signal, y(t) 524, as the first feedback signal 526. An ESO 528 receives the output signal, y(t) 524, and the process control variable, u(t) 528, as inputs. The ESO 528 is configured to estimate the disturbance, d 522. The ESO 528 generates, a series of n estimated disturbance canceling feedback signals, $Z_1(t), Z_2(t), \ldots Z_n(t)$ 530. A third amplifier multiplies the series of n estimated disturbance canceling feedback signals $Z_1(t), Z_2(t), \ldots Z_n(t)$ 530 by a state feedback vector, $K_S$ 532, to generate the series of second feedback signals, $K_SZ_1(t), K_SZ_2(t), \ldots K_SZ_n(t)$. The ESO 528 generates a third feedback signal, $Z_{n+1}(t)$ 534 based on an estimate of the process variable, u(t) 518. The set-point tracking controller and the ESO 528 are tuned by selecting values for $\alpha$, $\tau c$, and T to eliminate the disturbance, d 522, from the output signal, y(t) 524.

Frequency Domain Characteristics Analysis:

To analyze the characteristics of the FOI-LADRC in the frequency domain, and to avoid complex mathematical expressions, a second-order FOI-LADRC is used. For the second-order FOI-LADRC, matrices of the ESO described by equation (3) are given by:

$$A = \begin{bmatrix} 0 & 1 & 0 \\ 0 & 0 & 1 \\ 0 & 0 & 0 \end{bmatrix}, B = \begin{bmatrix} 0 \\ b_0 \\ 0 \end{bmatrix}, L = \begin{bmatrix} 3\omega_0 \\ 3\omega_0^2 \\ \omega_0^3 \end{bmatrix}, \text{ and } C = \begin{bmatrix} 1 & 0 & 0 \end{bmatrix}. \quad (31)$$

From the observer state, the transfer functions may be deduced to the estimated states $z_2(s)$ and $z_3(s)$ from the two inputs u(s) and y(s) of the observer. The estimated states $z_2(s)$ and $z_3(s)$ are used in the control law. The estimated states are given by:

$$z_2(s)=G_1(s)u(s)+G_2(s)y(s) \quad (32)$$

$$z_3(s)=G_3(s)u(s)+G_4(s)y(s) \quad (33)$$

where:

$$G_1 = \frac{b_0 s(s+\beta_1)}{\Delta(s)}, G_2 = \frac{s(\beta_2 s + \beta_3)}{\Delta(s)}, \quad (34)$$

$$G_3 = \frac{(\beta_3 b_0)}{\Delta(s)}, G_4 = \frac{\beta_3 s^2}{\Delta(s)};$$

$$\Delta(s) = (s+\omega_0)^3 = s^3 + 3\omega_0 s^2 + 3\omega_0^2 s^2 + \omega_0^3; \quad (35)$$

Figure 6:
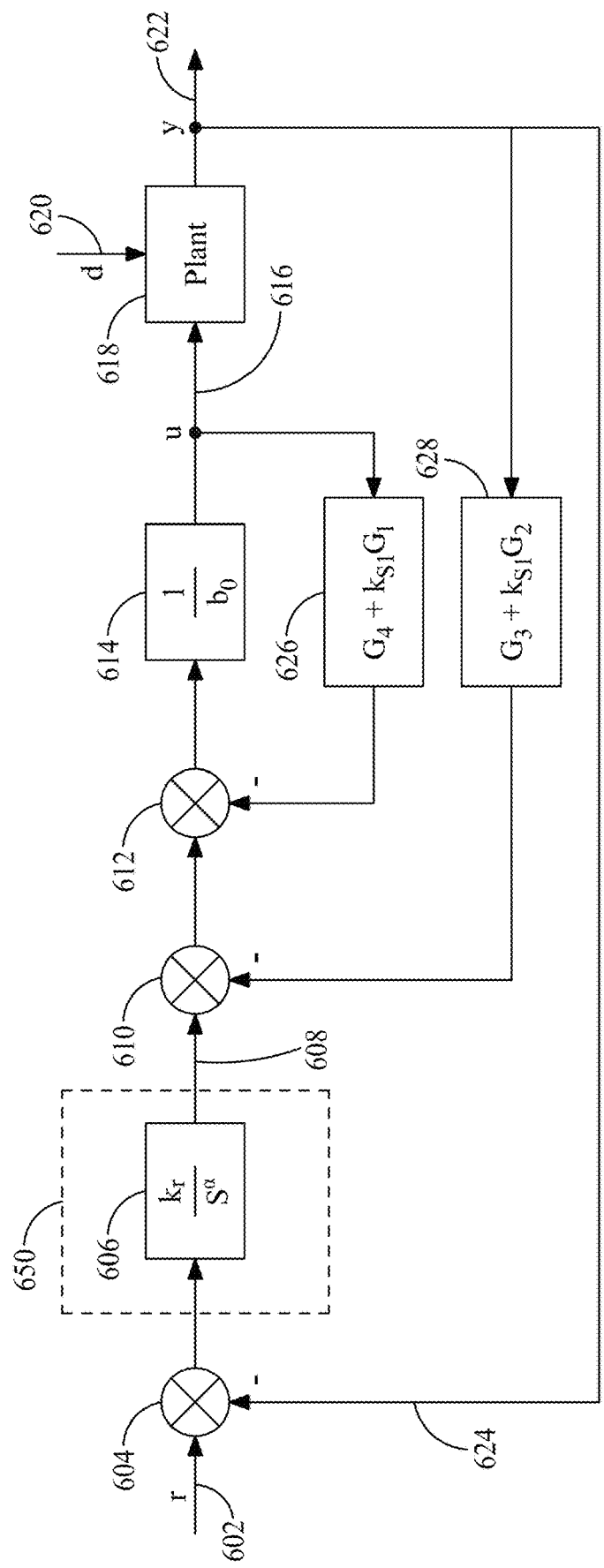
FIG. 6 is a block diagram of a second-order FOI-LADRC system, according to certain embodiments.

Using the relationships defined in equations (32)-(35), the CL control scheme of FIG. 5 is transformed into CL control scheme of FIG. 6.

FIG. 6 is a block diagram of a second-order FOI-LADRC system, according to exemplary aspects of the present disclosure. Construction and operation of the second-order FOI-LADRC system is substantially similar to previous descriptions of the FOI-LADRC system, except for CL feedback elements that are based on equations (32)-(35). FIG. 6 includes a first multiplier 604, a set-point tracking controller 650 having a fractional order integrator and a first amplifier 606, a second multiplier 610, a third multiplier 612, a second amplifier 614, a plant 618, a first feedback element 626 and a second feedback element 628.

In operation, a reference signal, r(t) 602 is input to a first multiplier 604. The first multiplier 604 multiples reference signal, r(t) with a first feedback signal 624 to generate a feedback modified reference signal, ε(t). A set-point tracking controller 650 including the fractional order integrator and the first amplifier 606 amplifies the feedback modified reference signal, ε(t) by a first integrated gain, $k_r/S^\alpha$ to generate a fractional order reference signal. A second multiplier 612 multiplies the gain modified fractional order reference signal, $Z'_r(t)$ by a series of second feedback signals and generates a modified signal, $u_0(t)$. A third multiplier 612 multiplies the modified signal, $u_0(t)$ by a third feedback signal and generating a feedback modified signal, $u'_0(t)$. A second amplifier 614 divides the feedback modified signal, $u'_0(t)$, by a static gain, $b_0$, and generates a process control variable, u(t) 616. The process control variable, u(t) is input to a plant 618. A disturbance, d 620, is applied to the plant 618. The plant 618 outputs an output signal, y(t) 622. The output signal, y(t) 622 is provided as an input to the first multiplier 604. The first multiplier 610 receives the output signal, y(t) 622, as the first feedback signal 624. A first feedback element 626 receives the output signal, u(t) 616, and a second feedback element 628 receives the process control variable, y(t) 622, as inputs. The first feedback element 626 generates an output for the third multiplier 612 and the second feedback element 628 generates an output for the second multiplier 610. The set-point tracking controller and the feedback elements are tuned by selecting values for α, τc, and T to eliminate the disturbance, d 620, from the output signal, y(t) 622.

Figure 7:
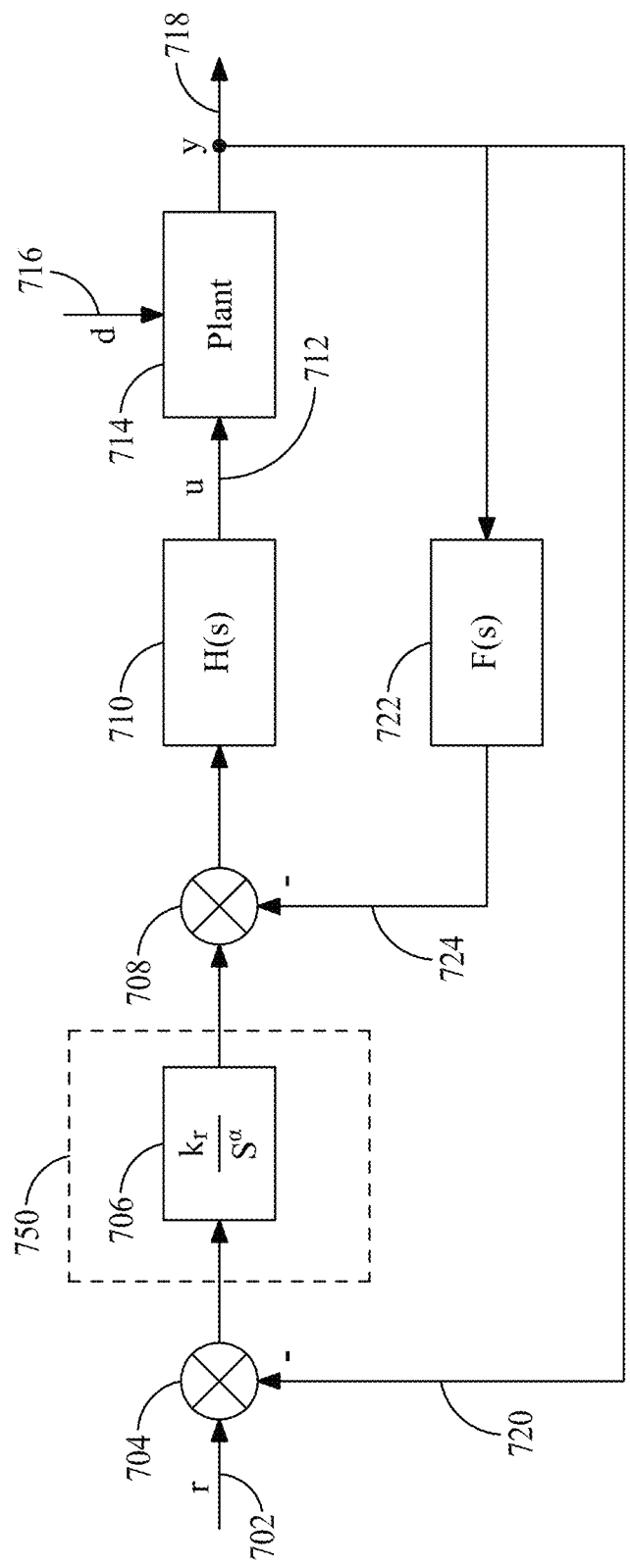
FIG. 7 is a simplified block diagram of the second-order FOI-LADRC, according to certain embodiments.

In order to calculate the expressions of u(s) according to r(s) and y(s), a block diagram of FIG. 6 is transformed into that of FIG. 7.

$$H(s) = \frac{\frac{1}{b_0}}{1 + \frac{1}{b_0}(k_{s1}G_1(s)+G_3(s))} = \frac{\Delta(s)}{b_0 d_H(s)}, \quad (36)$$

$$F(s) = k_{s1}G_2(s) + G_4(s) = \frac{n_F(s)}{\Delta(s)}; \quad (37)$$

$$d_H(s)=s^3+(\beta_1+k_{s1})s^2+(\beta_2+\beta_1 k_{s1})s$$

$$n_F(s)=(k_{s1}\beta_2+\beta_3)s^2+k_{s1}\beta_3 s \quad (38)$$

FIG. 7 is a simplified block diagram of the second-order FOI-LADRC system with a fractional order integral action, according to exemplary aspects of the present disclosure. Construction and operation of the simplified second-order FOI-LADRC system is substantially similar to FOI-LADRC system of FIG. 6, except that a second amplifier is combined with a first feedback element and termed as H(s). Further, a second feedback element is referred to as F(s).

In operation, a reference signal, r(t) 702 is input to a first multiplier 704. The first multiplier 704 multiples reference signal, r(t) with a first feedback signal 720 to generate a feedback modified reference signal, ε(t). A set-point tracking controller 750 including the fractional order integrator and the first amplifier 706 amplifies the feedback modified reference signal, ε(t) by a first integrated gain, $k_r/S^\alpha$ to generate a fractional order reference signal. A second multiplier 712 multiplies the gain modified fractional order reference signal, $Z'_r(t)$ by a series of second feedback signals 724 and generates a modified signal, $u_0(t)$. A second amplifier 714 amplifies the modified signal by a corresponding gain, and generates a process control variable, u(t) 712. The process control variable, u(t) is input to a plant 714. A disturbance, d 716, is applied to the plant 714. The plant 714 outputs an output signal, y(t) 718. The output signal, y(t) 718 is provided as an input to the first multiplier 704. The first multiplier 704 receives the output signal, y(t) 718, as the first feedback signal 720. A first feedback element 722 receives the output signal, u(t) 718 as input. The first feedback element 722 generates an output for the second multiplier 708. The set-point tracking controller 750 and the feedback element are tuned by selecting values for α, τc, and T to eliminate the disturbance, d 716, from the output signal, y(t) 718.

From FIG. 7, the transfer function between r(s) and y(s) and between f(s) and y(s) may be deduced, which is provided by:

$$u(s) = H(s)\left(\frac{k_r}{s^\alpha}(r(s)-y(s))-F(s)y(s)\right), \quad (39)$$

On the other hand, from equation (1) representing the model and considering the disturbances $d_u$ on the input and $d_y$ on the output to show the influence of each on the performance of the control structure, the control signal is given by $$u(s) = \frac{s^2}{b_0}(y(s)+d_y(s))-\frac{1}{b_0}f(s)-d_u(s), \quad (40)$$

Equating equations (39) and equation (40) leads to:

$$y(s)=G_{ry}(s)r(s)+G_{fy}(S)f(s)+G_{d_u y}(s)d_u(s)+G_{d_w y}(s)d_y(s), \quad (41)$$

where $$G_{ry} = \frac{1}{s^\alpha} \frac{k_r H(s)}{D(s)}, \quad (43)$$

$$G_{fy} = \frac{1}{b_0} \frac{1}{D(s)},$$

$$G_{d_u y} = = \frac{1}{D(s)},$$

$$G_{d_y y} = \frac{s^2}{b_0} \frac{1}{D(s)},$$

$$(42 \text{ and } D(s) = \frac{s^2}{b_0} + \frac{k_r H(s)}{s^\alpha} + H(s)F(s),$$

Substituting the transfer functions H(s) and F(s) by their respective expressions provided in the equation (36) and the equation (37), and after some algebraic calculations, we obtain:

$$G_{ry}(s) = \frac{\frac{1}{T_{\tau_c}}}{s^{2+\alpha} + \frac{1}{T}s^{1+\alpha} + \frac{1}{T_{\tau_c}}}; \quad (44)$$

$$G_{fy}(s) = \frac{s^{\alpha+1}\left(s^2 + \left(3\omega_0 + \frac{1}{T}\right)s\right) + \left(3\omega_0^2 + 3\omega_0\frac{1}{T}\right)}{(s+\omega_0)^3\left(s^{2+\alpha} + \frac{1}{T}s^{1+\alpha} + \frac{1}{T_{\tau_c}}\right)}; \quad (45)$$

$$G_{d_u y}(s) = b_0 G_{fy}(s), G_{d_y y}(s) = s^2 G_{fy}(s); \quad (46)$$

The equations (44)-(46) demonstrate that if the disturbance f(t) is estimated accurately and the parameter $b_0$ is accurately chosen, the output y(s) may depend on the parameters imposed on the CL Such dependence provides a very high robustness to the CL. Also, the transients of the DR and the SPT are similar because the corresponding transfer functions have the same denominator since dynamics of the observer can be ignored.

The FOI-LADRC system described above provide controls to systems with high relative degree using fractional order controllers and to impose the flatness of the phase margin, a new reference model using the BITF. This makes it possible to impose the iso-damping property in the CL response. The FOI-LADRC is designed to control a minimum phase stable system. A use of the FOI-LADRC system does not require modeling, and not all the parameters of the system are accessible.

Numerical Simulation

To illustrate the advantage of the FOI-LADRC control scheme, performances of the conventional LADRC, the IOI-LADRC and the FOI-LADRC are compared. A model of a linear stable system is given by:

$$y(s) = \frac{2s+4}{s^3 + 2s^2 + 4s + 4} u(s), \quad (47)$$

for which the relative degree is n=2 and the high frequencies gain is b=2. To compare these control structures, the CL step response is chosen to have a slight overshoot. Therefore, the CL reference model for the conventional LADRC is $$G_{clref}(s) = \frac{w_n^2}{s^3 + 2zw_n s + w_n^2}, \quad (48)$$

with z=0.52 and wn=5, which corresponds to an overshoot of about 14% and a settling time of about 2 units of time. For the IOI-LADRC, a third real pole is added, the reference model is given by:

$$G_{clref}(s) = \frac{p_r w_n^2}{(s+p_r)(s^3 + 2zw_n s + w_n^2)}, \quad (49)$$

To obtain similar performance with the FOI-LADRC, the CL reference model is given by:

$$G_{clref}(s) = \frac{1}{(1+T_s)\tau_c s^{\lambda+1} + 1} \quad (50)$$

with:

$$\tau_c = 0.15, \lambda = 0.3 \text{ and } T = \frac{\tau_c}{50} = 0.006.$$

Figure 8:
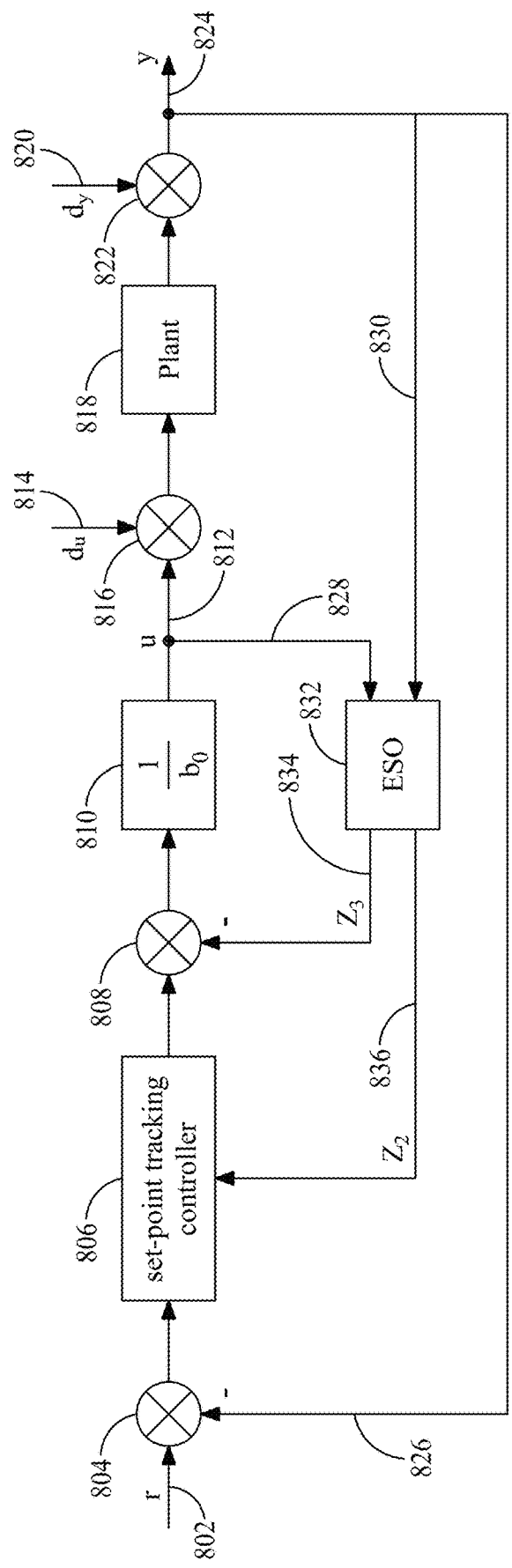
FIG. 8 is a block diagram of a simulation scheme having a set-point tracking controller, according to certain embodiments.

For all the control structures, the observer parameter design is provided by $\omega_0$=100. The value of $b_0$ is first chosen as $b_0$=b=2. To exemplify the performance of each control structure, a reference signal r=1(t) at t=0 is considered. A step signal disturbance denoted $d_u(t)$, of amplitude 10 is added to the input at t=2.5 and a second step signal disturbance, denoted $d_y(t)$, of amplitude 0.5 is added to the output at t=5. The amplitude of $d_u(t)$ is exaggerated to show the robustness of the LADRC control. Small values of this amplitude do not appear on the CL step responses curves. The simulation scheme is shown in FIG. 8, where the "set-point tracking controller" block is a controller associated with the ESO to obtain the conventional LADRC or the IOI-LADRC or the FOI-LADRC. A Crone approximation in the frequency range [$10^{-4}$ $10^{+4}$] with 20 cells is used to approximate the non-integer order integrator. The Crone approximation has N poles and N zeros within a frequency range [$\omega_l$, $\omega_h$] and is given by:

$$S^z \approx C \prod_{m=1}^{N} \frac{1 + \frac{s}{\omega_{\zeta,m}}}{1 + \frac{s}{\omega_{\pi,m}}} \quad (A)$$

$$\omega_{\zeta,m} = \omega_l \left(\frac{\omega_h}{\omega_l}\right)^{\frac{2m-1-z}{2N}} \quad (B)$$

$$\omega_{\pi,m} = \omega_l \left(\frac{\omega_h}{\omega_l}\right)^{\frac{2m-1+z}{2N}} \quad (C)$$

If z is real, the correct gain at 1 rad/s, which is $|(j\omega)^\alpha|=1$, $\forall \alpha$ must be set by adjusting C. if z is complex, both gain and phase at 1 rad/s must be set by adjusting C. For simpler calculation, frequency of 1 rad/s is chosen. If frequency of 1 rad/s falls outside the range of [$\omega_l$, $\omega_h$], any other suitable frequency has to be used for calculation.

If |z| is less than one, relation (A) is valid for the frequency range [$10\omega_l$, $0.1\omega_h$]. Both gain and phase have ripples, which decrease as N increases. Typically, N should be at least equal to the number of decades in [$\omega_l$, $\omega_h$] for acceptable results. When |z| is greater than one, the frequency range where the approximation behaves acceptably becomes narrower, and approximations such as $S^z = S^{[R(z)]}$ $S^{z-[R(z)]}$ or $S^z = S^{[R(z)]} S^{z-[R(z)]}$ (for which only the last term needs to be approximated) are employed.

FIG. 8 is a block diagram of a simulation scheme having a set-point tracking controller 806, according to exemplary aspects of the present disclosure. FIG. 8 includes a first multiplier 804, the set-point tracking controller 806, a second multiplier 808, a second amplifier 810, a third multiplier 816, a plant 818, a fourth multiplier 822, an ESO 832.

In operation, a reference signal, r(t) 802 is input to the first multiplier 804. The first multiplier 804 multiples reference signal, r(t) with a first feedback signal 826 to generate a feedback modified reference signal. A set-point tracking controller 806 amplifies the feedback modified reference signal. The set-point tracking controller 806 may include a fractional order integrator and a first amplifier with a first integrated gain. The second multiplier 808 multiplies the gain modified fractional order reference signal by a series of second feedback signals 834 and generates a modified signal. The second amplifier 810 amplifies the modified signal, by a corresponding gain, and generates a process control variable, u(t) 812. The third multiplier 816 multiplies process control variable, u(t) with step signal disturbance, $d_u(t)$ 814. The multiplied signal is input to a plant 818. The plant 818 outputs an intermediate output signal. The fourth multiplier 822 multiplies the intermediate output signal with a second step signal disturbance, denoted $d_y(t)$ 820, generating an output signal, y(t) 824. The output signal, y(t) 824 is provided as feedback input to the first multiplier 804. The first multiplier 804 receives the output signal, y(t) 718, as a first feedback signal 826. An ESO 832 receives the output signal, y(t) 824, and process control variable, u(t) 812, as inputs. The ESO 528 is configured to estimate the step signal disturbance, $d_u(t)$ 814, and the second step signal disturbance, $d_y(t)$ 820 based on the output signal, y(t) 824, and process control variable, u(t) 812. The ESO 832 generates disturbance canceling feedback signals $Z_2(t)$ and $Z_3(t)$. The feedback signal $Z_2(t)$ is input to the set-point tracking controller 806, and the $Z_3(t)$ is input to the second multiplier 808. The set-point tracking controller 806 and the ESO 832 are tuned by selecting values for $\alpha$, $\tau c$, and T to eliminate the step signal disturbance, $d_u(t)$ 814, and the second step signal disturbance, $d_y(t)$ 820, from the output signal, y(t) 824.

Figure 9:
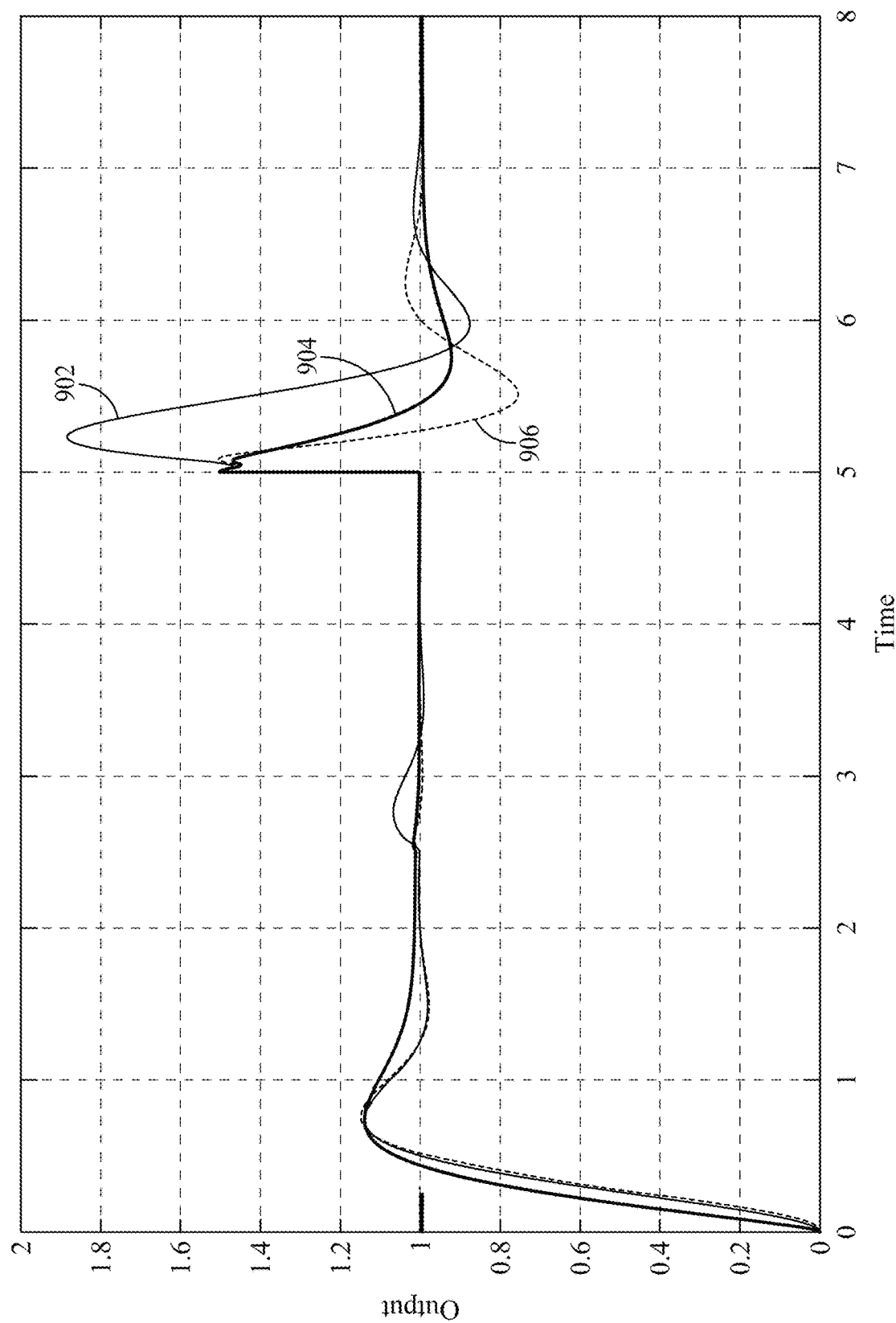
FIG. 9 is a graphical plot illustrating a CL step response with external disturbance on an input and an output, according to certain embodiments.
Figure 10:
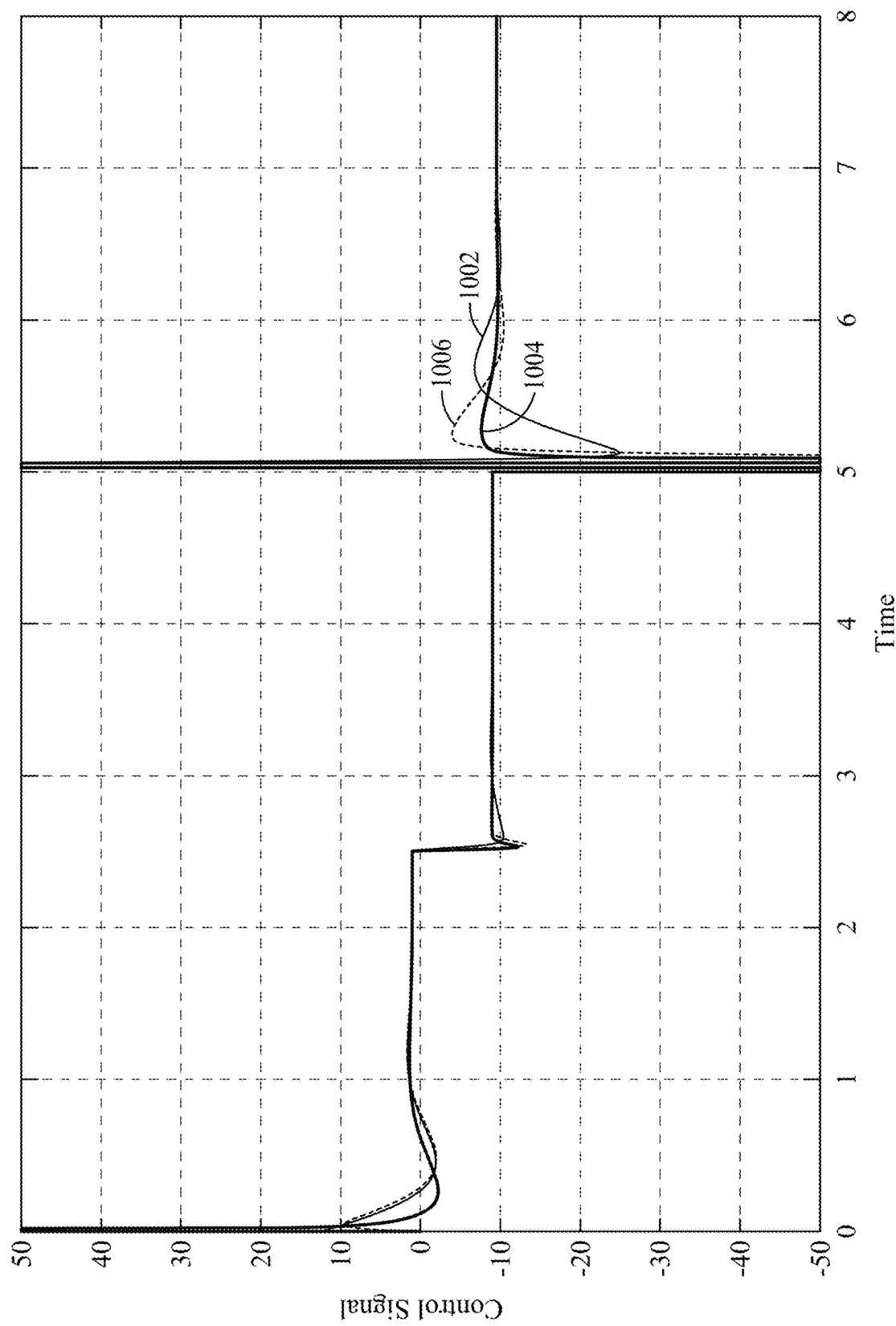
FIG. 10 illustrates a control signal plot for three control schemes, according to certain embodiments.

Disturbance Rejection and Set-Point Tracking Performance Analysis:

FIG. 9 is a graphical plot illustrating CL step response with external disturbance on an input and an output with external disturbance on the input at t=2:5 and on the output at t=5. FIG. 9 illustrates a CL step response 902 of a conventional LADRC system, a CL step response 904 of a FOI-LADRC system and a CL step response 906 of a IOI-LADRC system. FIG. 10 illustrates a control signal plot for three control schemes, according to exemplary aspects of the present disclosure. Signal 1002 is a control signal of a conventional LADRC system, signal 1004 is a control signal of a IOI-LADRC system, and signal 1006 is a control signal of a FOI-LADRC system. The control signal plot of FIG. 10 illustrate that the conventional LADRC system and IOI-LADRC system require lesser control signal power. Table 1 demonstrates performance of the CL step response for the conventional LADRC, IOI-LADRC and FOI-LADRC.

TABLE 1

Performance of the closed-loop step response for the conventional LADRC, IOI-LADRC and FOI-LADRC

|  | $M_p$ (%) | $t_{pic}$ | $\Delta_{y\,du}$ | $t_{r\,du}$ | $\Delta_{y\,dy}$ | $t_{r\,dy}$ | $U_{spt}$ | $U_{du}$ | $U_{dy}$ |
|---|---|---|---|---|---|---|---|---|---|
| Conventional LADRC | 14.1 | 0.74 | 0.067 | 1.45 | 1.88 | 2.32 | 12.42 | 9.37 | $U_{dy}$50 |
| IOI-LADRC | 14.9 | 0.76 | 0.016 | 0.40 | 1.5 | 2.02 | 9.51 | 12.21 | 50 |
| FOI-LADRC | 14.1 | 0.74 | 0.009 | 0.45 | 1.5 | 1.69 | 50 | 11.13 | 50 |

Table 1 summarizes the main characteristics of the obtained results, where $M_p$(%) is the overshoot, $t_{pic}$ is the time corresponding of the first peak that measures the controller's ability to react to changes in the setpoint, $\Delta_{y\,du}$ is the deviation of the output due to the disturbance on the input, tr du is the corresponding disturbance rejection time, $\Delta_{y\,dy}$ is the deviation of the output due to the disturbance on the output, $t_{r\,dy}$ its corresponding disturbance rejection time, $U_{spt}$ is the maximum value of the control signal required to the setpoint tracking, $U_{du}$ and $U_{dy}$ are the maximum value of the control signal necessary to reject the disturbance on the input and the disturbance on the output, respectively. The observations are provided below.

With regards to the SPT, results obtained using the three control schemes are similar since all the three control schemes make it possible to achieve the control objectives, namely an overshoot of approximately 14% and a same peak time, and therefore a similar settling time. On response to an external disturbance $d_u(t)$, results indicate performances by the IOI-LADRC system and the FOI-LADRC system are substantially similar and outperform the performance of the conventional LADRC system. Also, a deviation on the output is 0.9% and 1.6% for the IOI-LADRC system and FOI-LADRC system, respectively, and the time needed to reject this disturbance is of the order of 0.4 seconds, while the deviation on the output is within the range of 6.7% with a DR time of about 1.45 for the conventional LADRC.

With respect to a disturbance on the output, the difference is not significant for the IOI-LADRC and FOI-LADRC. The deviation is about 50% and the output returns to its value after time 0.3 seconds, whereas with the conventional LADRC, the deviation is about 50%, but the time required to return the output to its initial value is substantially greater for the conventional LADRC (2.32 seconds). The time required to return the output to its initial value is 2.01 seconds and 1.69 seconds of the IOI-LADRC and FOI-LADRC respectively, indicating better efficiency and robustness of FOI-LADRC of the present disclosure.

Figure 11:
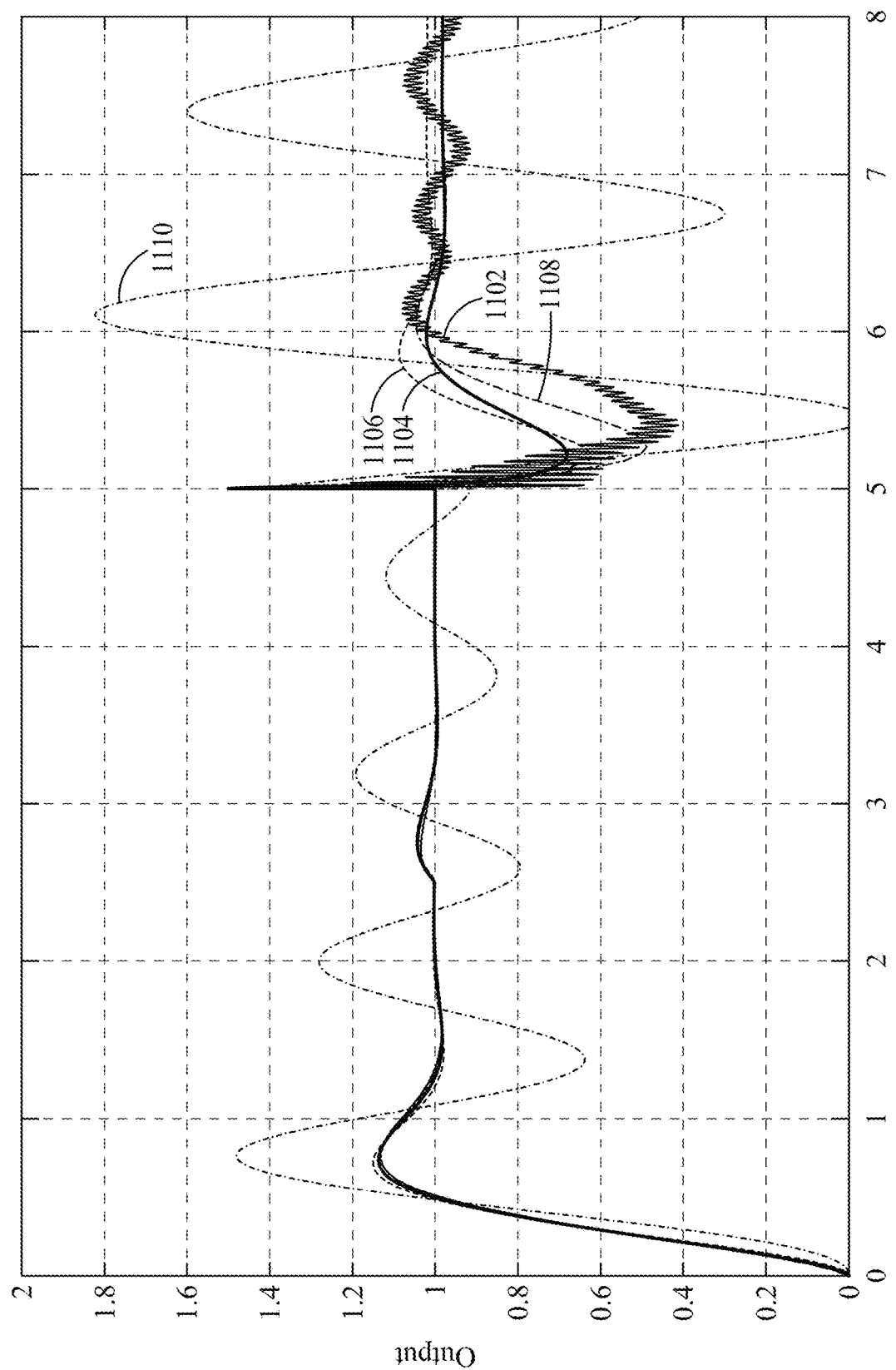
FIG. 11 is a plot illustrating an influence of variation of gain, b, on a performance of the conventional LADRC system, according to certain embodiments.

Influence of Gain b on the Control System Performance:

To demonstrate the robustness of the three control schemes relative to the gain b, the gain value is changed to show its effect on the SPT as well as on the rejection of external disturbances $d_u(t)$ and $d_y(t)$. The values of gain b for which the system becomes unstable are also to be known. FIG. 11 is a plot illustrating an influence of variation of b on a performance of the conventional LADRC. The plot illustrates results obtained with the conventional LADRC for b=0.1, b=0.5, b=1, b=2, b=3. Plot line 1102 illustrates a performance of the conventional LADRC for b=3. Plot line 1104 illustrates a performance of the conventional LADRC for b=1. Plot line 1106 illustrates a performance of the conventional LADRC b for b=0.5. Plot line 1108 illustrates a performance of the conventional LADRC for b=2. Signal 1110 illustrates a performance of the conventional LADRC for b=0.1.

Figure 12A:
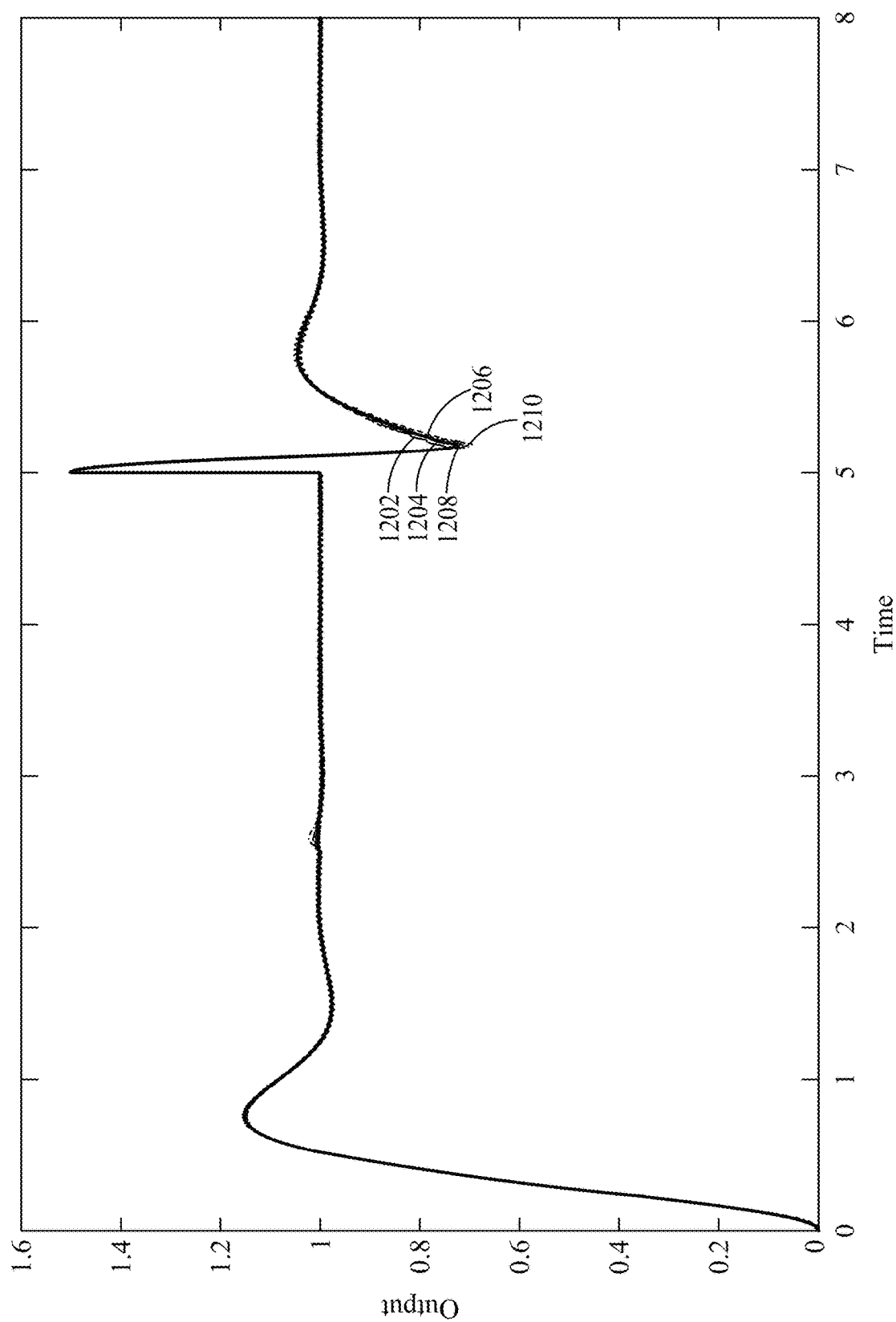
FIG. 12A is a plot illustrating an influence of variation of b on a performance of an integer order integral (IOI)-LADRC system, according to certain embodiments.
Figure 12B:
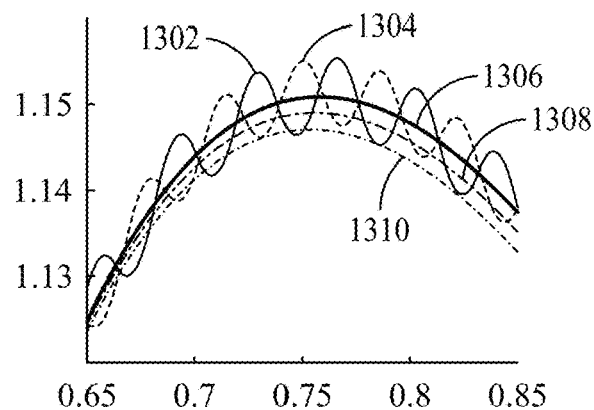
FIG. 12B illustrates a portion of the plot of FIG. 12A showing an overshoot of output, according to certain embodiments.
Figure 12C:
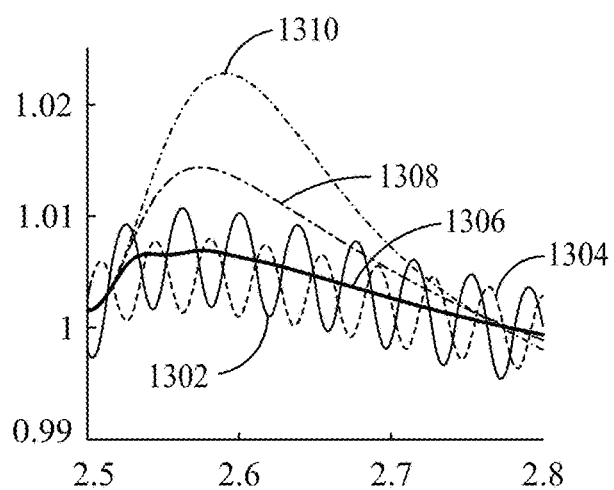
FIG. 12C illustrates a portion of the plot of FIG. 12A showing a disturbance on an input, according to certain embodiments.
Figure 12D:
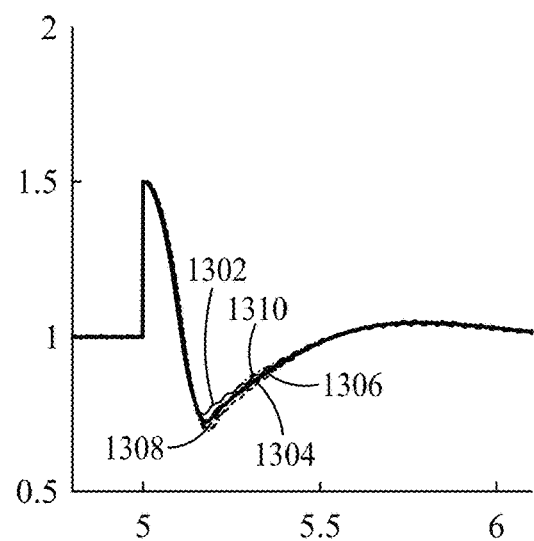
FIG. 12D illustrates a portion of the plot of FIG. 12A showing a disturbance on an output, according to certain embodiments.

FIG. 12A is a plot illustrating an influence of variation of gain b on performance of the IOI-LADRC system. The plot illustrates results obtained with the conventional LADRC for b=0.1, b=0.5, b=1, b=2, b=3. Plot line 1202 illustrates a performance of the IOI-LADRC for b=0.1. Plot line 1204 illustrates a performance of the IOI-LADRC for b=2. Plot line 1206 illustrates a performance of the IOI-LADRC for b=0.5. Plot line 1208 illustrates a performance of the IOI-LADRC for b=1. Signal 1210 illustrates a performance of the IOI-LADRC for b=3. FIG. 12B illustrates an enlarged portion of the CL step response of FIG. 12A between time 0.65 and 0.85. FIG. 12B represents an overshoot of the input responses having plot lines 1202-1210. FIG. 12C illustrates an enlarged portion of the CL step response of FIG. 12A between time 2.5 and 2.8. FIG. 12C represents a disturbance on the output having plot lines 1202-1210. FIG. 12D illustrates an enlarged portion of the CL step response of FIG. 12A between time 4.8 and 5.8. FIG. 12D also represents a disturbance on the output having plot lines 1202-1210.

Figure 13A:
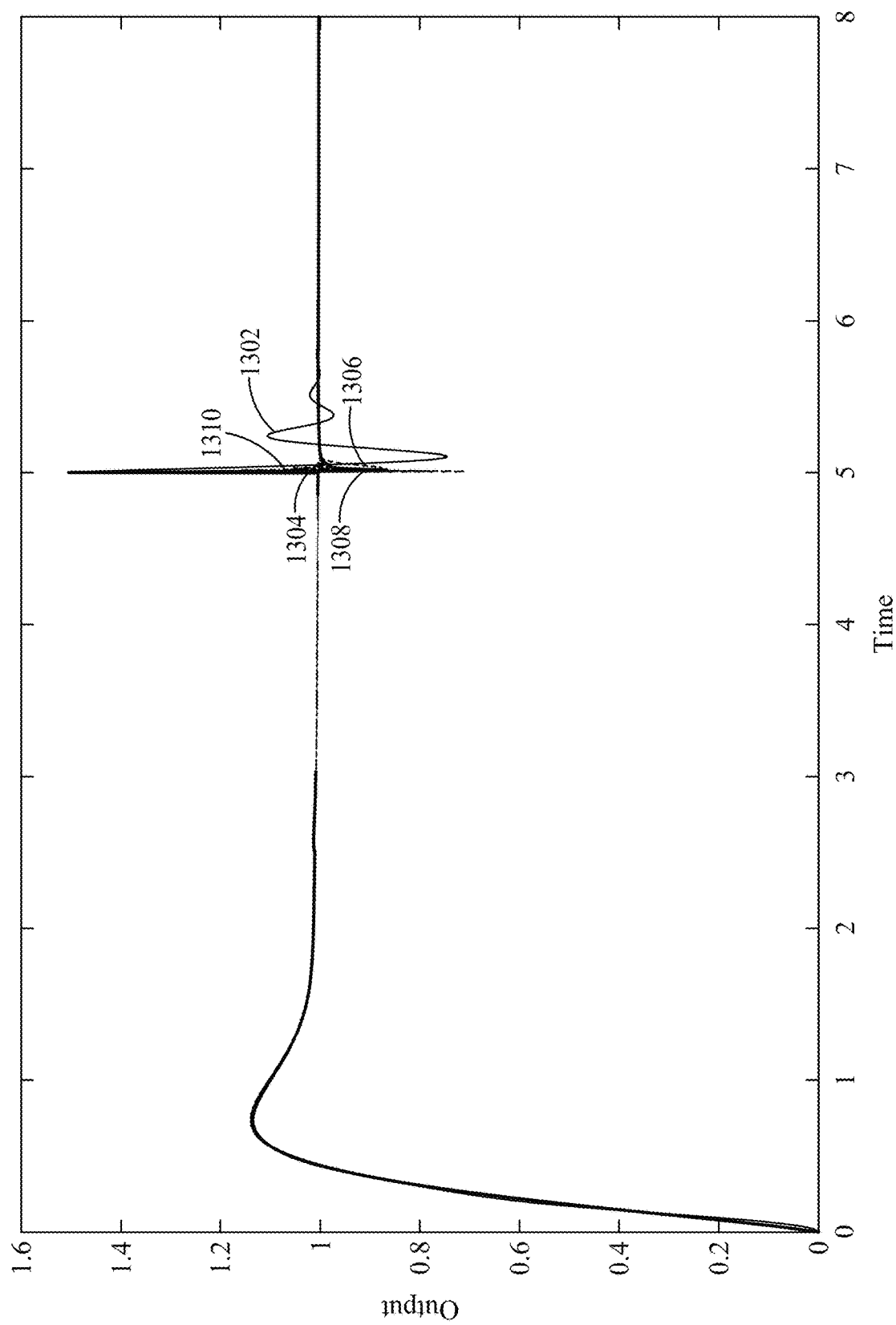
FIG. 13A is a plot illustrating an influence of variation of gain, b, on performance of FOI-LADRC, according to certain embodiments.
Figure 13B:
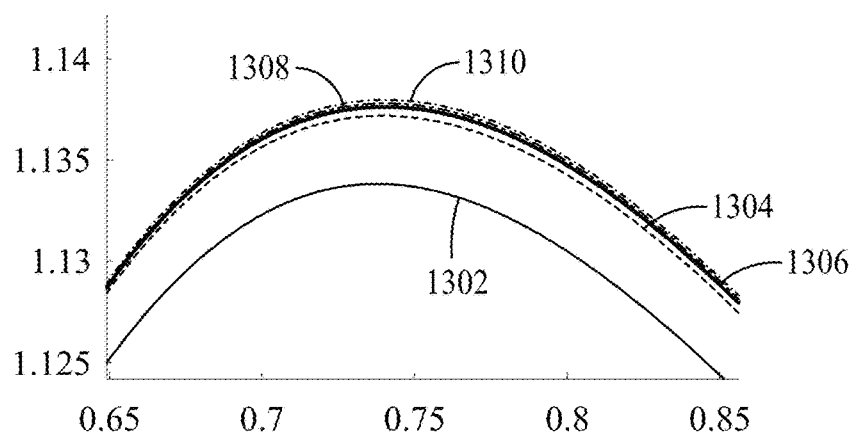
FIG. 13B illustrates a portion of the plot of FIG. 13A, showing an overshoot of output, according to certain embodiments.
Figure 13C:
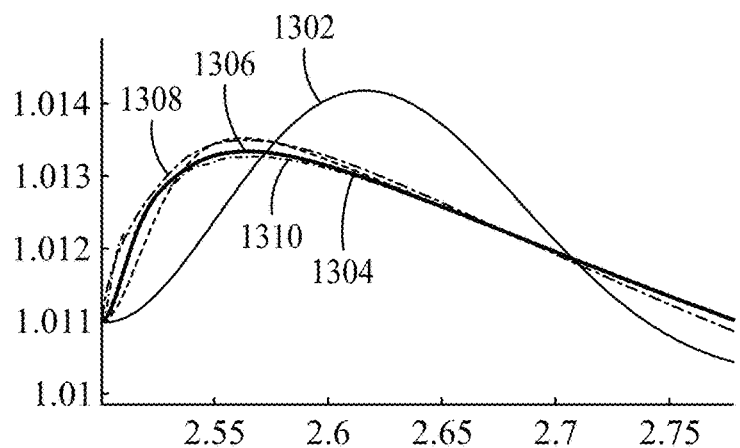
FIG. 13C illustrates a portion of the plot of FIG. 13A, showing a disturbance on an input, according to certain embodiments.
Figure 13D:
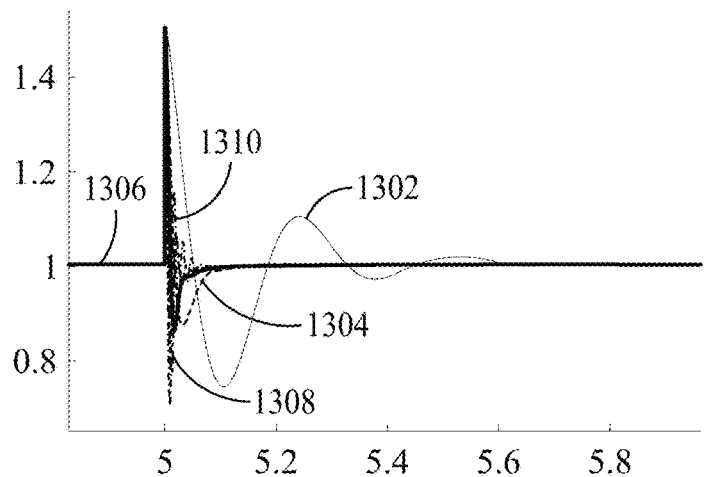
FIG. 13D illustrates a portion of the plot of FIG. 13A, showing a disturbance on an output, according to certain embodiments.

FIG. 13A is a plot illustrating an influence of variation of gain b on performance of the LADRC. The plot illustrates results obtained with the conventional LADRC for b=0.1, b=0.5, b=1, b=2, b=3. Plot line 1302 illustrates a performance of the FOI-LADRC for b=0.1. Plot line 1304 illustrates a performance of the FOI-LADRC for b=1. Plot line 1306 illustrates a performance of the FOI-LADRC for b=2. Plot line 1308 illustrates a performance of the FOI-LADRC for b=0.5. Signal 1310 illustrates a performance of the FOI-LADRC for b=3. FIG. 13B illustrates an enlarged portion of the CL step response of FIG. 13A between time 0.65 and 0.85. FIG. 13B represents an overshoot of the output responses having plot lines 1302-1310. FIG. 13C illustrates an enlarged portion of the CL step response of FIG. 13A between time 2.5 and 2.8. FIG. 13C represents a disturbance on the input having plot lines 1302-1310. FIG. 13D illustrates an enlarged portion of the CL step response of FIG. 13A between time 4.8 and 5.8. FIG. 13D also represents a disturbance on the output having plot lines 1302-1310.

For the variation limits of gain b for which the CL remains stable, the conventional LADRC maintains the stability of the CL for (0.07<b<4.15), the range of variation of b is (0.04<b<8.43) for the IOI-LADRC, and for the FOI-LADRC, this range of variation is (0.02<b<6.15). FIG. 11, FIG. 12, and FIG. 13 clearly demonstrate that the influence of b on the CL performance, the FOI-LADRC system fares better than the conventional LADRC and IOI-LADRC systems.

Figure 14:
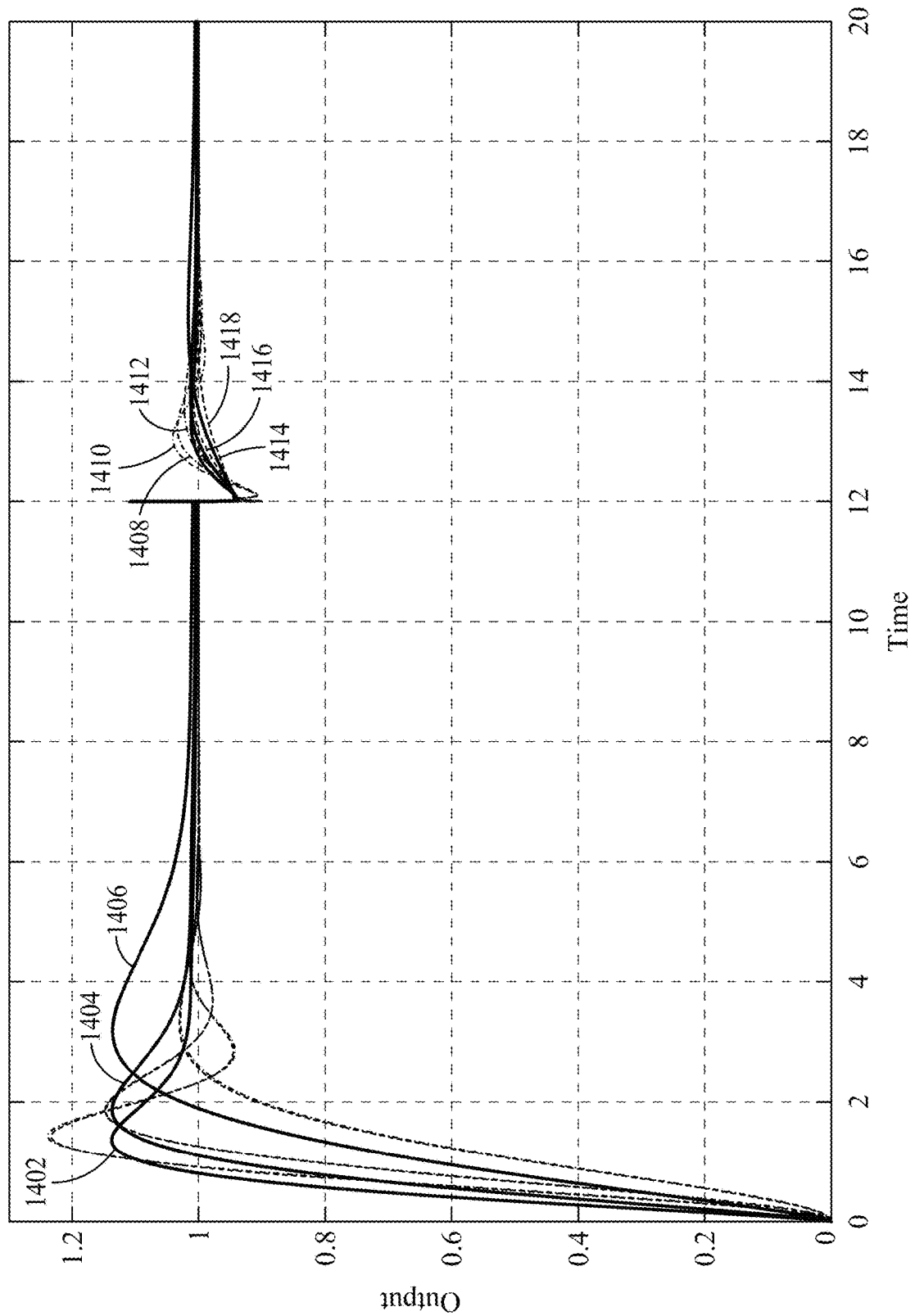
FIG. 14 is a plot illustrating a robustness of the conventional LADRC system, the IOI-LADRC system and the FOI-LADRC system relative to a gain $k_r$, according to certain embodiments.

Closed-Loop Robustness Relative to the Set-Point Tracking Controller Gain Variation:

FIG. 14 is a plot illustrating robustness of the conventional LADRC system, the IOI-LADRC system and the FOI-LADRC system. The plot illustrates the CL step response when the gain $k_r$ of a SPT controller changes. Three values of $k_r$ are considered: the nominal value, 1.5, and 0.5 times this value. FIG. 14 shows that an overshoot of the CL step response changes for the conventional LADRC and the IOI-LADRC structures. Signals 1402, 1404 and 1406 correspond to CL step response of FOI-LADRC system for the nominal value, 1.5, and 0.5 times the value, respectively. Signals 1408, 1410 and 1412 correspond to CL step response of the conventional LADRC system for the nominal value, 1.5, and 0.5 times the value, respectively. Signals 1414, 1416 and 1418 correspond to CL step response of the FOI-LADRC system for the nominal value, 1.5, and 0.5 times the value, respectively. As seen in FIG. 14, the CL response of the FOI-LADRC system is insensitive to the variations of $k_r$. FIG. 14 demonstrates a superior iso-damping property of the FOI-LADRC structure compared to the conventional LADRC and IOI-LADRC based systems.

Experimental Results Applied to a Cart-Pendulum System:

FIG. 15 illustrates an experimental setup of a cart-pendulum system 1500 to which the conventional LADRC system, the conventional IOI-LADRC system and FOI-LADRC system of the present disclosure are applied. The cart-pendulum system involves movement of two interacting systems and its modeling is relatively complex, thus, making it a suitable example to compare performance of the ESO based FOC system 500 with the conventional LADRC system 400. The objective of the cart-pendulum system is to control position of the cart, as the pendulum swing is considered to be an internal and permanent disturbance. The experimental setup of the cart-pendulum system 1500 comprises a cart 1502, a track 1504, a first pendulum 1506*a* and a second pendulum 1506*b*, a DC motor 1508, and a belt 1510.

The cart 1502 moves along a 0.8 m length of the track 1504. The cart 1502 has a shaft on which two pendula, the first pendulum 1506*a* and the second pendulum 1506*b* are mounted and can swing freely. The cart 1502 moves along the track 1504 causing the two pendulums 1506 to swing. Inversely, the swing of the two pendula 1506 disrupts the movement of the cart 1502. The DC motor 1508, fixed to the end of the track 1504, allows the cart 1502 to move by pulling the belt 1510 in both, right and left directions. The voltage applied to the DC motor 1508 is a control signal and position of the cart 1502 on the track 1504 is a controlled variable. Angle of the pendula 1506 and the position of the cart 1502 are measured by optical encoders having a resolution of 1024 lines per revolution. In an aspect of the present disclosure, a first optical encoder measures the position of the cart 1502, a second optical encoder measures the angle of the first pendulum 1506*a*, and a third optical encoder measures the angle of the second pendulum 1506*b*. In an aspect of the present disclosure, the experimental setup of the cart-pendulum system 1500 is interfaced with an Advantech PCI-1711 card (a Multifunction Peripheral Component Interconnect card) and output feedback controller is implemented in a MATLAB/Simulink environment, with a sampling time of 0.001 s.

Figure 16A:
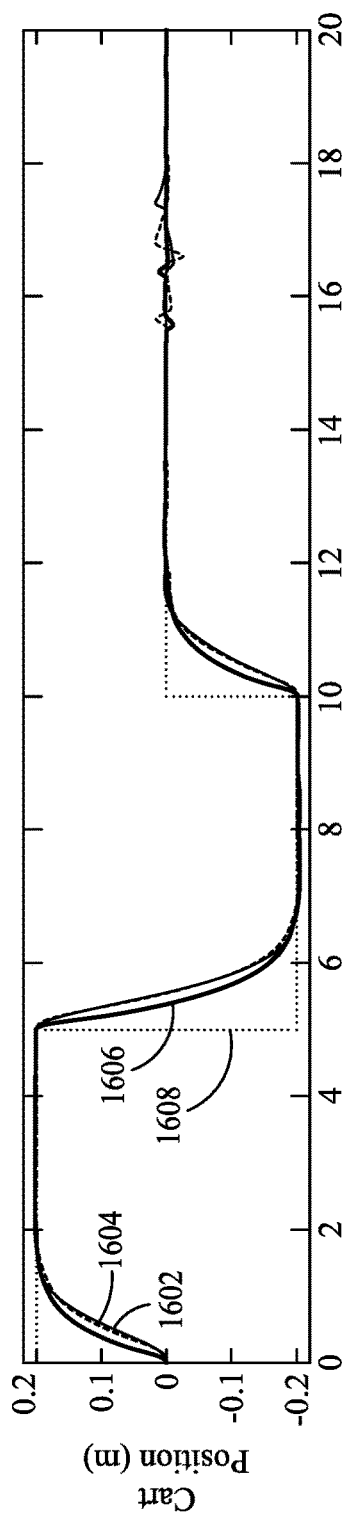
FIG. 16A is a plot illustrating CL behavior of the conventional LADRC, the IOI-LADRC system and the FOI-LADRC system for a cart position, according to certain embodiments.
Figure 16B:
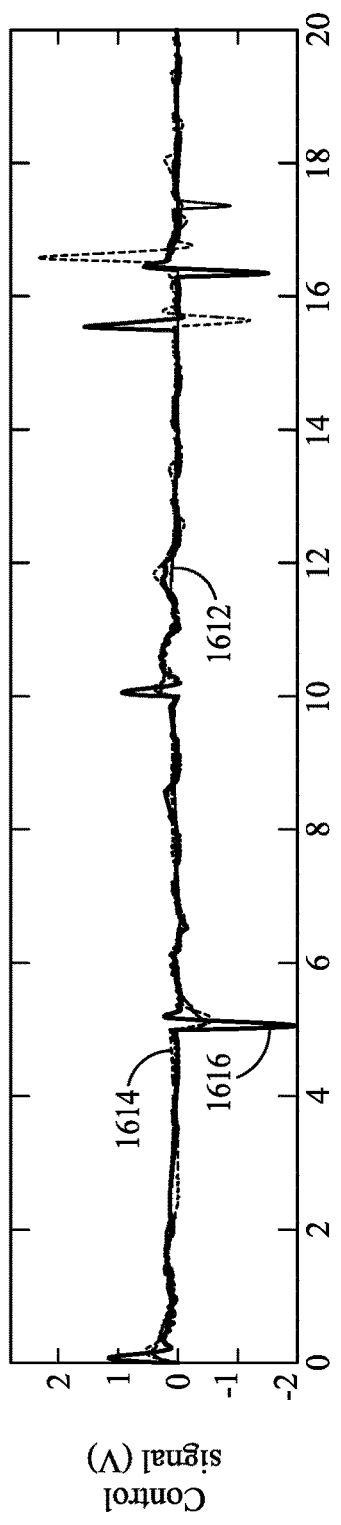
FIG. 16B is a plot illustrating CL behavior of the conventional LADRC, the IOI-LADRC system and the FOI-LADRC system for a control signal, according to certain embodiments.
Figure 16C:
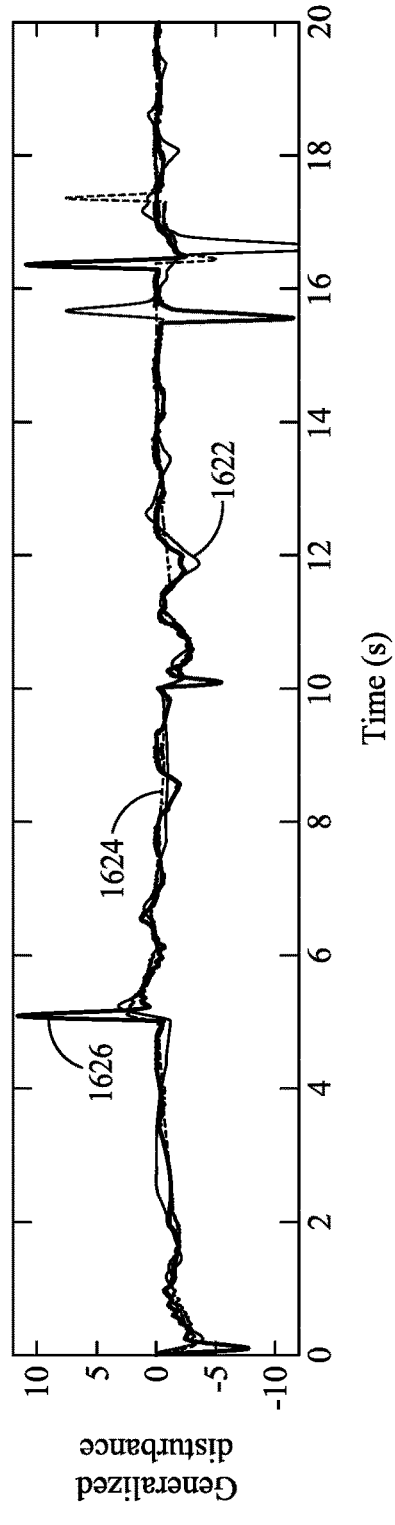
FIG. 16C is a plot illustrating CL behavior of the conventional LADRC, the IOI-LADRC system and the FOI-LADRC system for a generalized disturbance, according to certain embodiments.
Figure 16D:
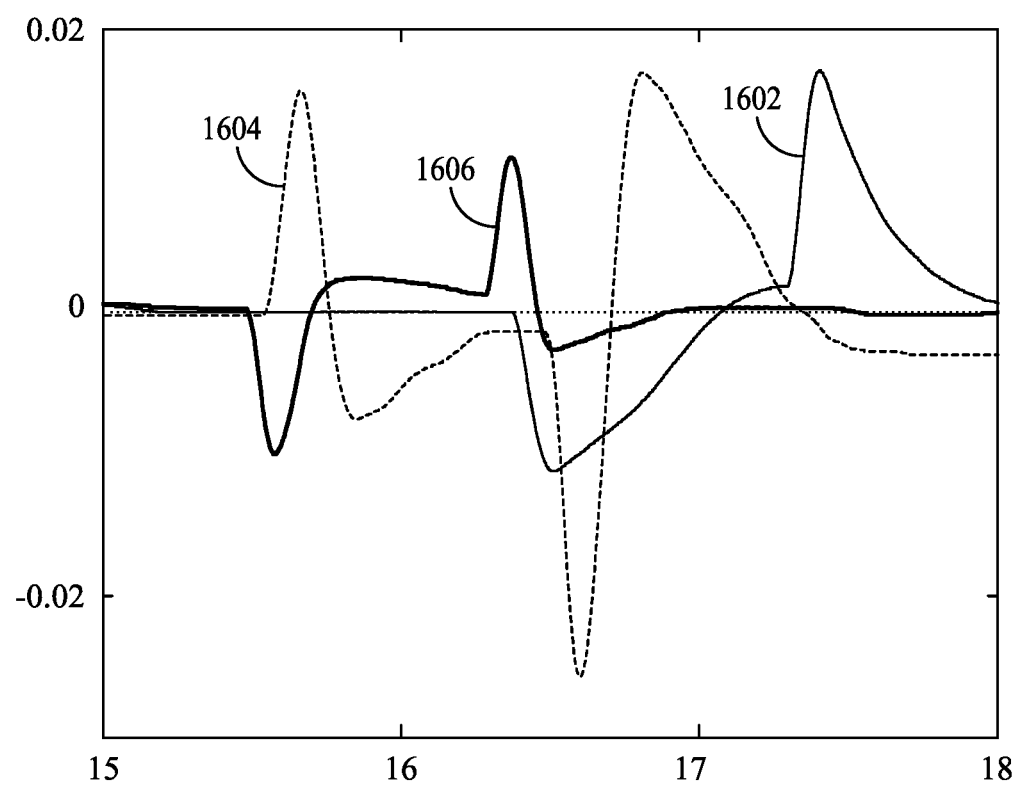
FIG. 16D is a plot illustrating an enlarged portion of CL behavior of cart position at time period between 15-18 seconds shown in FIG. 16A, according to certain embodiments.

To evaluate and compare the performance of the conventional LADRC system 400, IOI-LADRC system and FOI-LADRC system, design parameters of the observer are set at: $\omega_0=100$ rad/s and $b_0=10$. For the conventional LADRC system and the IOI-LADRC system, the SPT controller is designed based on the reference model provided by equation (48) with $\omega_n=3$ rad/s and $z=0.9$. A third pole $p_r=50$ is added to design the SPT controller of the IOI-LADRC system. To get similar transient performance, the FOI-LADRC is designed based on the model provided by equation (50) where $\tau C=0.5$ s and $\lambda=0.05$. As the sampling time is set to 0.001 s, the time constant of the model as per equation (50) is given by $T=\tau c/20=0.025$ s. CRONE approximation technique is used to implement the fractional order integral action in the frequency range $[10^{-4}\ 50]$ with 10 cells. For evaluation, reference positions include: +0.2 m at t=0 s, 0.2 m at t=5 s, and 0 at t=10 s. In addition, an external disturbance is applied around t=15 s by tapping the cart 1502 manually. FIG. 16A is plot illustrating CL behavior of the conventional LADRC, the IOI-LADRC system and the FOI-LADRC system illustrates experimental results obtained. FIG. 16A illustrates a cart position where a plot line 1602 is a CL behavior of the conventional LADRC, a plot line 1604 is a CL behavior of IOI-LADRC, and a plot line 1606 is a CL behavior due to generalized disturbance. FIG. 16B illustrates an evolution of the control signal where a plot line 1612 is a CL behavior of the conventional LADRC, a plot line 1614 is a CL behavior of IOI-LADRC, and a plot line 1616 is a CL behavior due to the generalized disturbance. FIG. 16C illustrates estimation of the generalized disturbance where a plot line 1622 is a CL behavior of the conventional LADRC, a plot line 1624 is a CL behavior of IOI-LADRC, and a plot line 1626 is a CL behavior of FOI-LADRC. FIG. 16D provides an enlarged portion of CL behavior at cart position at time between time 15-18 seconds shown in FIG. 16A.

Table 2 summarizes the performances of the three control schemes for the three steps of the reference signal. $M_p(\%)$ is the overshoot, $U_m(V)$ is the maximum value of the control signal and $f_m$ is the maximum variation of the estimated generalized disturbance.

FIGS. 16A to 16D and Table 2 demonstrate that the cart moves to a desired position with a small overshoot for all control schemes. The generalized disturbance, the internal as well as the external disturbance, have been well estimated and compensated by the three LADRC structures. As seen, when there is a change in the output due to the setpoint or the external disturbance, the generalized disturbance changes accordingly. This means that the observer estimates these changes. The variation in the generalized disturbance while there is no change in the setpoint or external disturbance is due to the oscillations of the pendulum, which are considered as internal disturbances. Also, in FIG. 16A to 16D, the effect of the control signal for the FOI-LADRC structure is clearly seen. The effect is due to the fact that the transient response obtained by the FOI-LADRC is faster than the conventional LADRC systems.

A comparison of the three LADRC structures is also performed by studying their robustness against the variations of the set-point controller parameter and the variations of a parameter of the cart-pendulum system. To demonstrate the robustness of the LADRC schemes against the setpoint controller parameter variations, three values of the parameter $k_r$ are chosen: a tuned value and a value obtained by multiplying this tuned value by 0.5 and by 1.5. Also, to demonstrate the robustness of the studied LADRC schemes against the parameters of the controlled system, the three LADRC structures are evaluated for two values of the cart weight: the normal value 2.3 kg and the value modified by adding on the cart an additional metal mass weighing 0.72 kg.

The results obtained are illustrated in FIG. 17A to 17C, FIG. 18A to 18C, and Table (3) for the conventional LADRC scheme, in FIG. 19A to 19C, FIG. 20A to 20C and Table (4) for the IOI-LADRC scheme and FIG. 21A to 21C, FIG. 22A to 22C and Table (5) for the FOI-LADRC scheme.

Figure 17A:
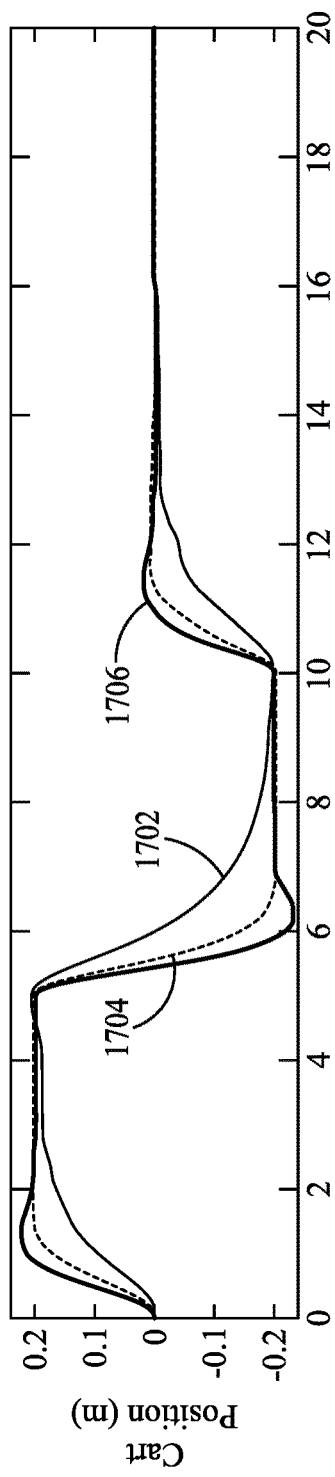
FIG. 17A is a plot illustrating a robustness of the conventional LADRC against the gain $k_r$ for a cart position, according to certain embodiments.
Figure 17B:
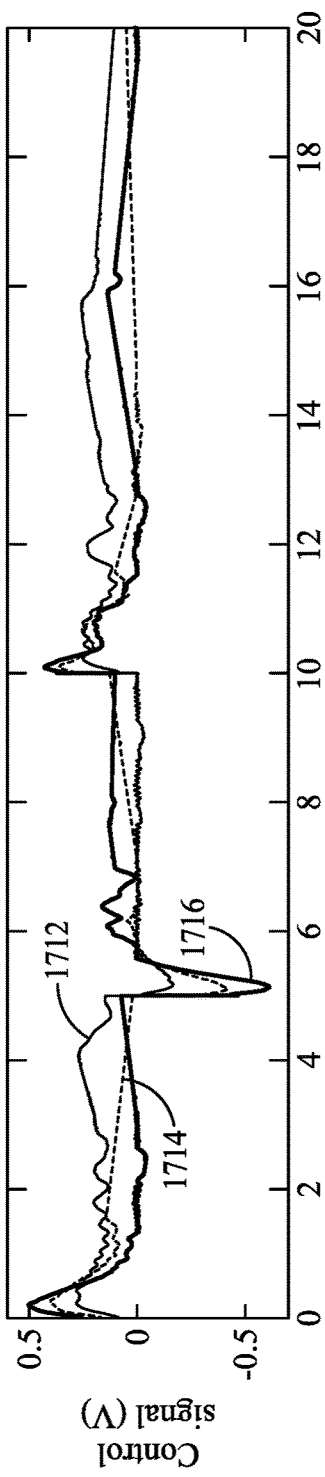
FIG. 17B is a plot illustrating a robustness of the conventional LADRC against the gain $k_r$ for a control signal, according to certain embodiments.
Figure 17C:
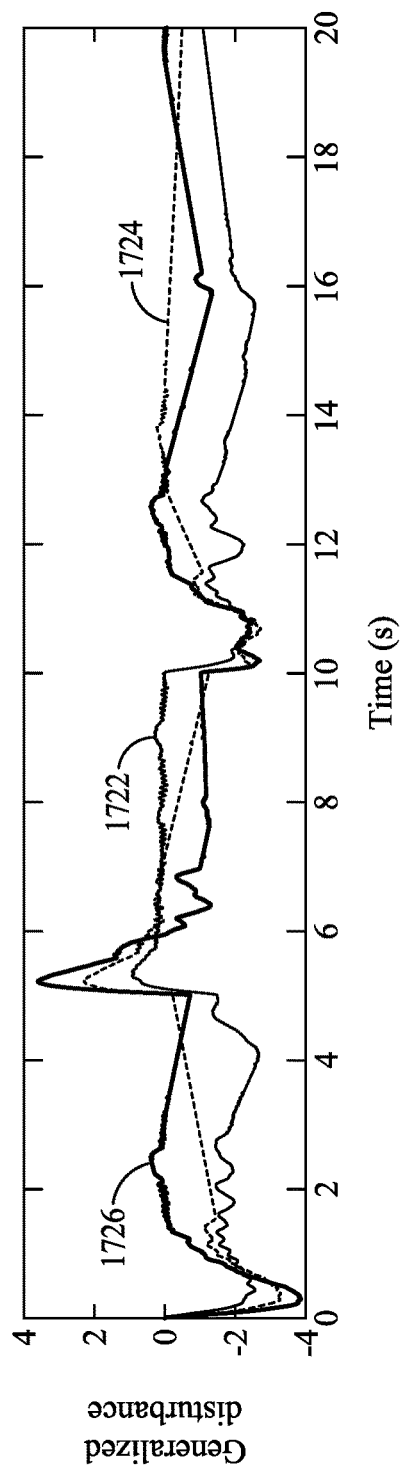
FIG. 17C is a plot illustrating a robustness of the conventional LADRC against the gain $k_r$ for a generalized disturbance, according to certain embodiments.

FIG. 17A to 17C are plots illustrating a robustness of conventional LADRC for the gain $k_r$. FIG. 17A illustrates a cart position where a plot line 1702 is a CL step response for $0.5 \times k_r$, a plot line 1704 is a CL step response for a tuned $k_r$, and a plot line 1706 is a CL step response for $1.5 \times k_r$. FIG. 17B illustrates a control signal where a plot line 1712 is a CL step response for $0.5 \times k_r$, a plot line 1714 is a CL step response for a tuned $k_r$, and a plot line 1716 is a CL step response for $1.5 \times k_r$. FIG. 17C illustrates a generalized disturbance signal where a plot line 1722 is a CL step response for $0.5 \times k_r$, a plot line 1724 is a CL step response for a tuned $k_r$, and a plot line 1726 is a CL step response for $1.5 \times k_r$. Table 3 provides results of measurements.

TABLE 2

Performance of the conventional LADRC system, the IOI-LADRC system and the FOI- LADRC schemes.

| | First step | | | Second step | | | Third step | | |
|---|---|---|---|---|---|---|---|---|---|
| | $M_p$ | $U_m$ | $f_m$ | $M_p$ | $U_m$ | $f_m$ | $M_p$ | $U_m$ | $f_m$ |
| Conventional LADRC | 1.3 | 0.40 | 3.25 | 0.95 | 0.393 | 2.28 | 0.6 | 0.36 | 2.40 |
| IOI-LADRC | 0.45 | 0.59 | 4.03 | 1.1 | 0.52 | 3.07 | 0.4 | 0.41 | 2.35 |
| FOI-LADRC | 1.4 | 1.13 | 3.80 | 0.85 | 1.84 | 5.30 | 0.3 | 1.10 | 3.60 |

TABLE 3

Conventional LADRC scheme robustness against parameter $k_r$.

|  | First step | | | Second step | | | Third step | | |
| --- | --- | --- | --- | --- | --- | --- | --- | --- | --- |
|  | $M_p$ | $U_m$ | $f_m$ | $M_p$ | $U_m$ | $f_m$ | $M_p$ | $U_m$ | $f_m$ |
| nominal value | 1.3 | 0.40 | 3.25 | 0.95 | 0.393 | 2.28 | 0.6 | 0.36 | 2.40 |
| 0.5 × $k_r$ | — | 0.28 | 2.56 | — | 0.163 | 0.92 | — | 0.25 | 2.26 |
| 1.5 × $k_r$ | 11.2 | 0.50 | 3.84 | 15.9 | 0.60 | 3.58 | 1.8 | 0.43 | 2.69 |

Figure 18A:
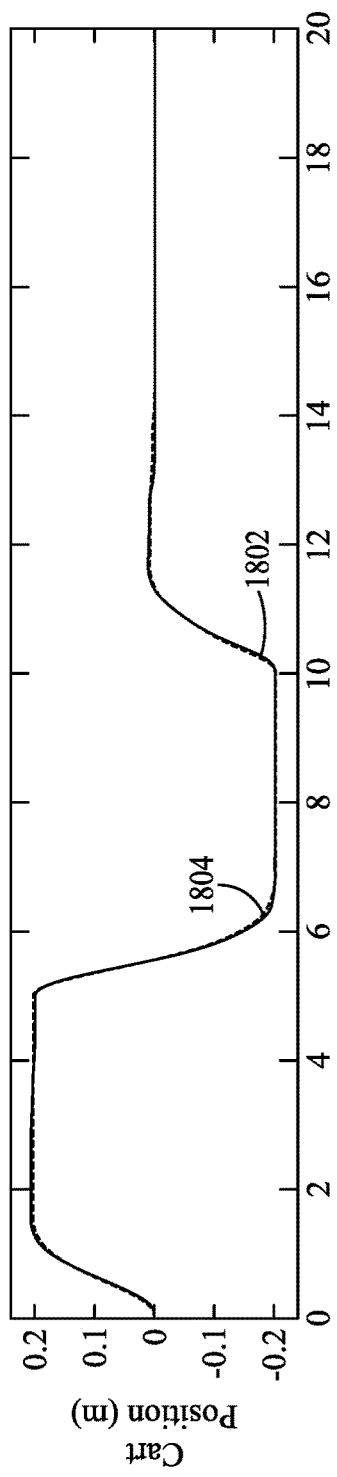
FIG. 18A is a plot illustrating a robustness of the conventional LADRC against a cart-weight variation for a cart position, according to certain embodiments.
Figure 18B:
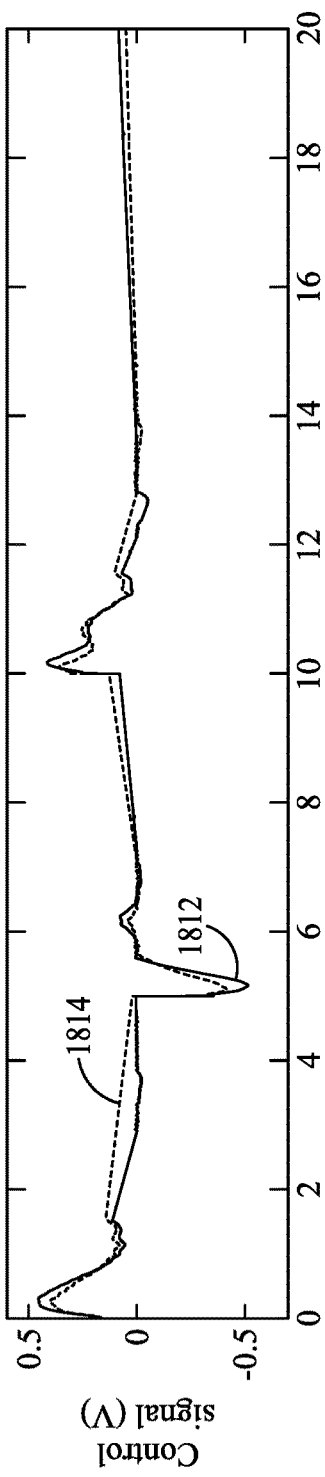
FIG. 18B is a plot illustrating a robustness of the conventional LADRC against a cart-weight variation for a control signal, according to certain embodiments.
Figure 18C:
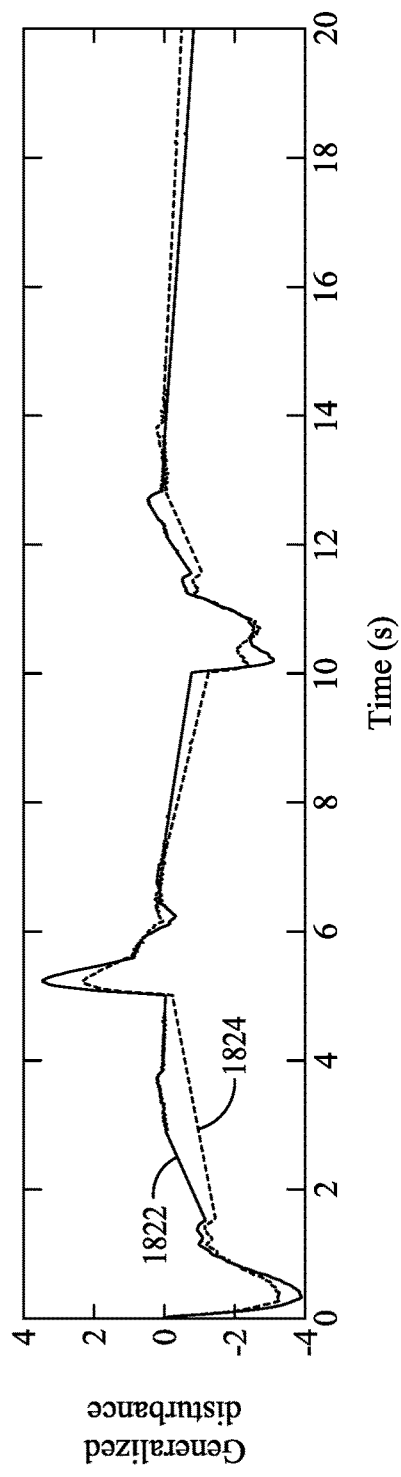
FIG. 18C is a plot illustrating a robustness of the conventional LADRC against a cart-weight variation for a generalized disturbance, according to certain embodiments.

FIG. 18A to 18C are plots illustrating robustness of conventional LADRC against the cart weight variation. FIG. 18A illustrates a cart position where a plot line 1802 is a CL step response for a nominal cart weight (2.3 kg), and a plot line 1804 is a CL step response for a nominal cart weight with an added weight (3.02 kg). FIG. 18B illustrates a control signal where a plot line 1812 is a CL step response for 3.02 kg, and a plot line 1814 is a CL step response for a 2.3 kg. FIG. 18C illustrates a generalized disturbance signal where a plot line 1822 is a CL step response for a 3.02 kg, and a plot line 1824 is a CL step response for a 2.3 kg.

Figure 19A:
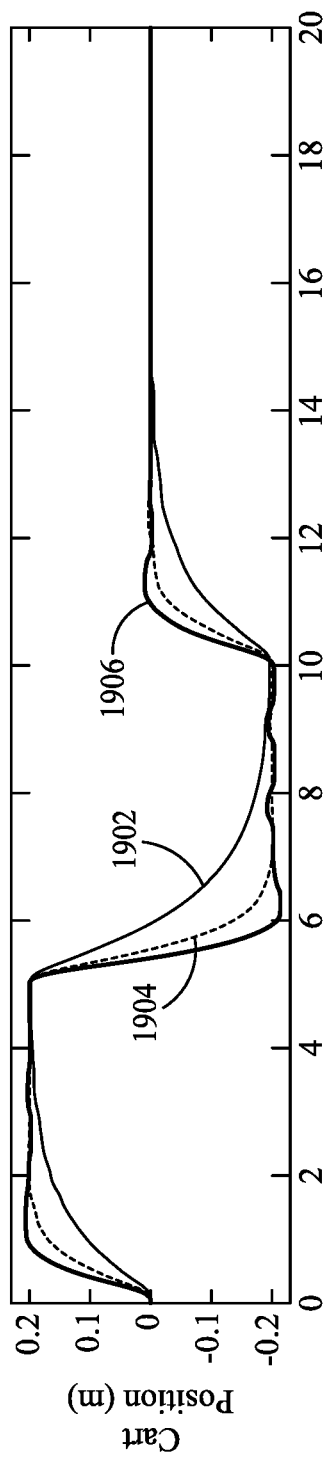
FIG. 19A is a plot illustrating a robustness of the IOI-LADRC against the gain $k_r$ for a cart position, according to certain embodiments.
Figure 19B:
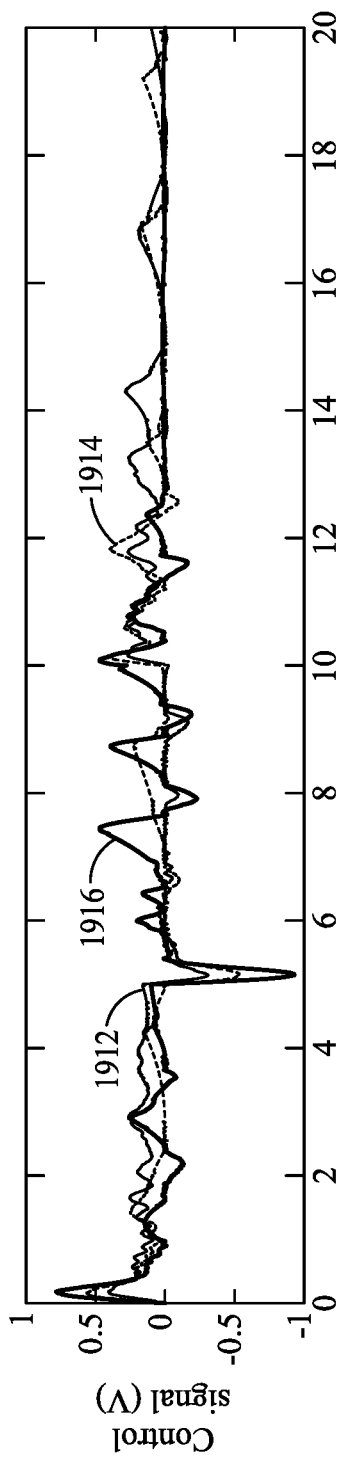
FIG. 19B is a plot illustrating a robustness of the IOI-LADRC against the gain $k_r$ for a control signal, according to certain embodiments.
Figure 19C:
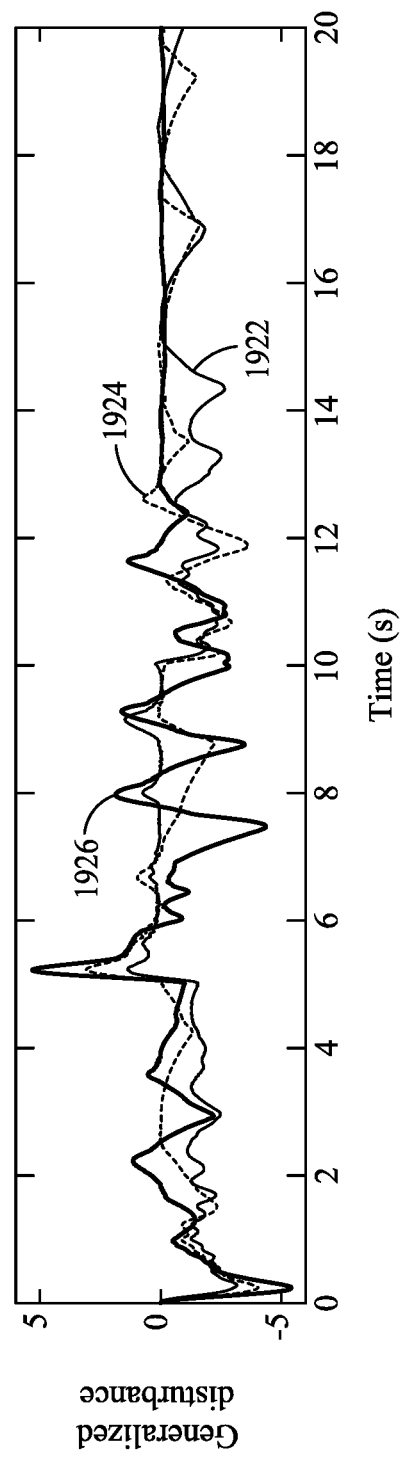
FIG. 19C is a plot illustrating a robustness of the IOI-LADRC against the gain $k_r$ for a generalized disturbance, according to certain embodiments.

FIG. 19A to 19C are plots illustrating robustness of the IOI-LADRC against the gain $k_r$. FIG. 19A illustrates a cart position where a plot line 1902 is a CL step response for 0.5×$k_r$, a plot line 1904 is a CL step response for a tuned $k_r$, and a plot line 1906 is a CL step response for 1.5×$k_r$. FIG. 19B illustrates a control signal where a plot line 1912 is a CL step response for 0.5×$k_r$, a plot line 1914 is a CL step response for a tuned $k_r$, and a plot line 1916 is a CL step response for 1.5×$k_r$. FIG. 19C illustrates a generalized disturbance signal where a plot line 1922 is a CL step response for 0.5×$k_r$, a plot line 1924 is a CL step response for a tuned $k_r$, and a plot line 1926 is a CL step response for 1.5×$k_r$.

Figure 20A:
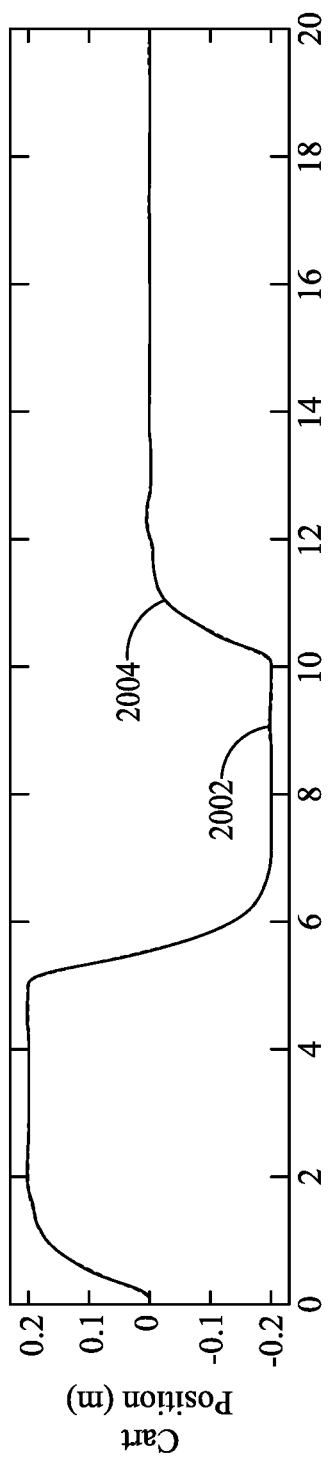
FIG. 20A is a plot illustrating a robustness of the IOI-LADRC against the cart-weight variation for a cart position, according to certain embodiments.
Figure 20B:
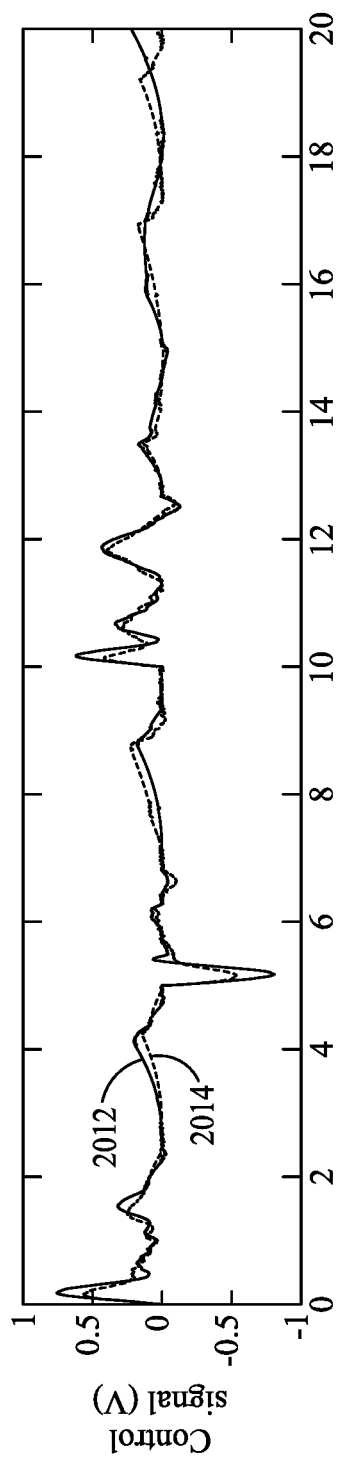
FIG. 20B is a plot illustrating a robustness of the IOI-LADRC against the cart-weight variation for a control signal, according to certain embodiments.
Figure 20C:
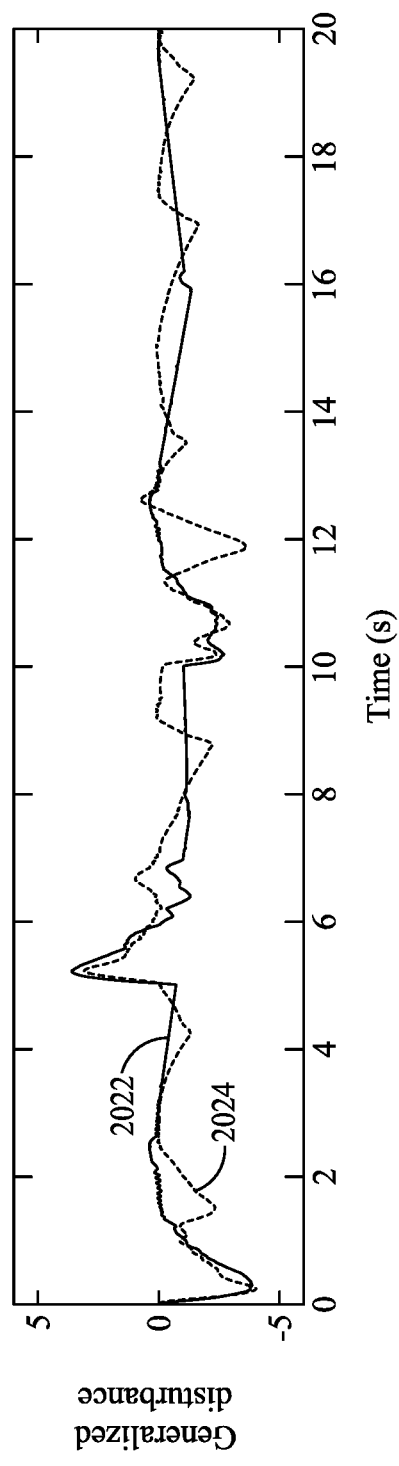
FIG. 20C is a plot illustrating a robustness of the IOI-LADRC against the cart-weight variation for a generalized disturbance, according to certain embodiments.

FIG. 20A to 20C are plots illustrating robustness of IOI-LADRC against the gain $k_r$. FIG. 20A illustrates a cart position where a plot line 2002 is a CL step response for a 2.3 kg, and a plot line 2004 is a CL step response for a 3.02 kg. FIG. 20B illustrates a control signal where a plot line 2012 is a CL step response for 3.02 kg, and a plot line 2014 is a CL step response for a 2.3 kg. FIG. 20C illustrates a generalized disturbance signal where a plot line 1822 is a CL step response for 3.02 kg, and a plot line 1824 is a CL step response for a 2.3 kg. Table 4 provides results of measurements against parameter $k_r$.

TABLE 4

IOI-LADRC scheme robustness against parameter $k_r$.

|  | First step | | | Second step | | | Third step | | |
| --- | --- | --- | --- | --- | --- | --- | --- | --- | --- |
|  | $M_p$ | $U_m$ | $f_m$ | $M_p$ | $U_m$ | $f_m$ | $M_p$ | $U_m$ | $f_m$ |
| nominal value | 0.45 | 0.59 | 4.03 | 1.1 | 0.52 | 3.07 | 0.4 | 0.41 | 2.35 |
| 0.5 × $k_r$ | — | 0.38 | 3.15 | — | 0.27 | 1.38 | — | 0.26 | 2.01 |
| 1.5 × $k_r$ | 2.85 | 0.77 | 5.36 | 7.0 | 0.93 | 5.31 | 1.0 | 0.47 | 2.82 |

Figure 21A:
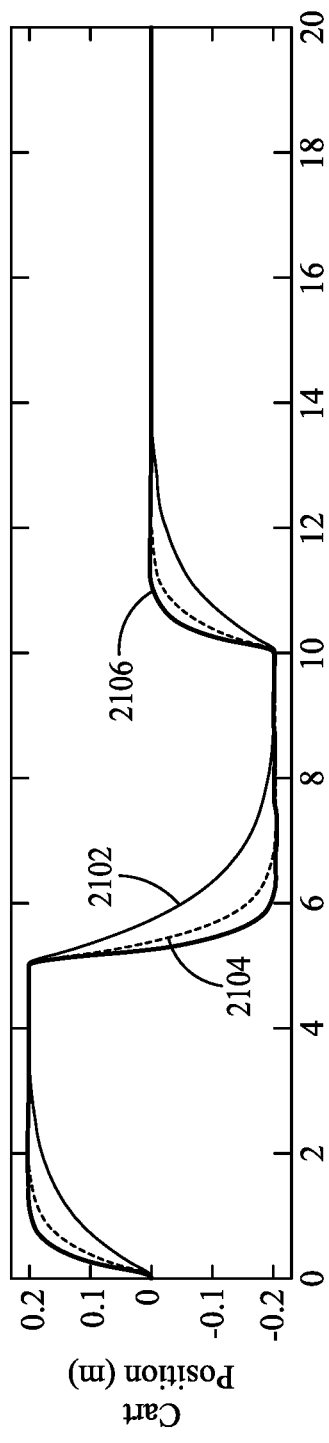
FIG. 21A is a plot illustrating a robustness of the FOI-LADRC against the gain $k_r$ for a cart position, according to certain embodiments.
Figure 21B:
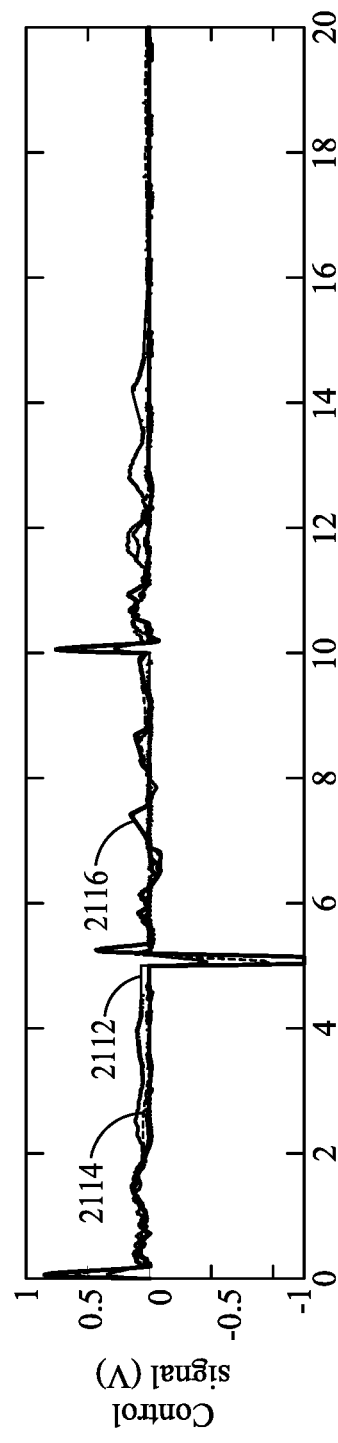
FIG. 21B is a plot illustrating a robustness of the FOI-LADRC against the gain $k_r$ for a control signal, according to certain embodiments.
Figure 21C:
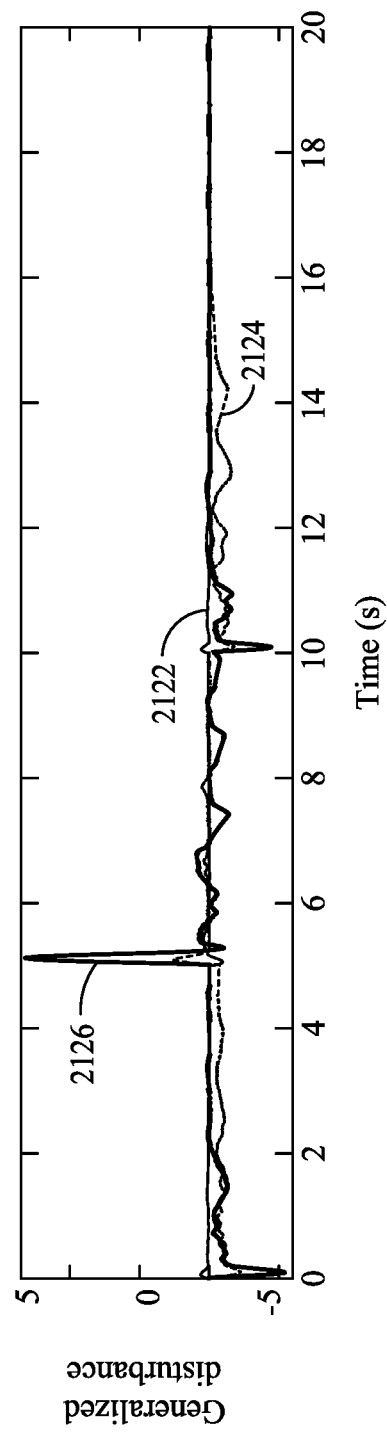
FIG. 21C is a plot illustrating a robustness of the FOI-LADRC against the gain $k_r$ for a generalized disturbance, according to certain embodiments.

FIG. 21A to 21C are plots illustrating robustness of the FOI-LADRC against the gain $k_r$. FIG. 21A illustrates a cart position where a plot line 2102 is a CL step response for 0.5×$k_r$, a plot line 2104 is a CL step response for a tuned $k_r$, and a plot line 2106 is a CL step response for 1.5×$k_r$. FIG. 21B illustrates a control signal where a plot line 2112 is a CL step response for 0.5×$k_r$, a plot line 2114 is a CL step response for a tuned $k_r$, and a plot line 2116 is a CL step response for 1.5×$k_r$. FIG. 21C illustrates a generalized disturbance signal where a plot line 2122 is a CL step response for 0.5×$k_r$, a plot line 2124 is a CL step response for a tuned $k_r$, and a plot line 2126 is a CL step response for 1.5×$k_r$.

Figure 22A:
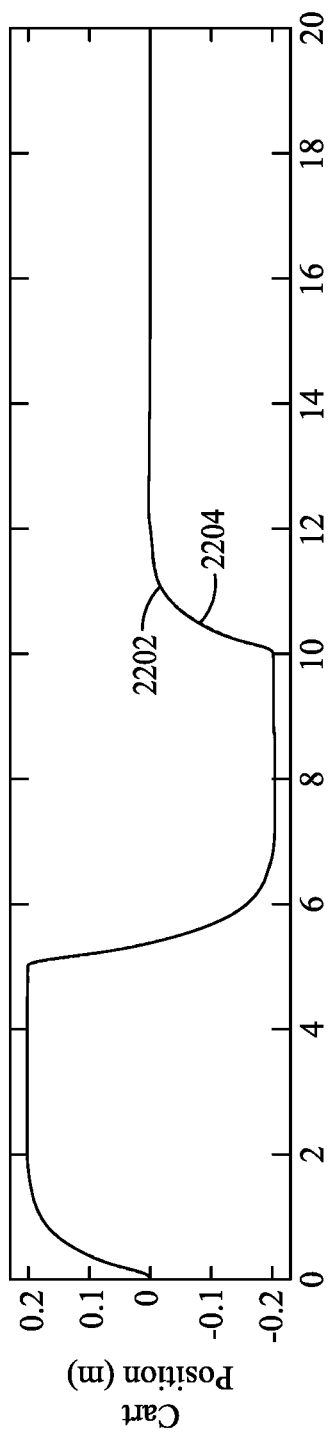
FIG. 22A is a plot illustrating a robustness of the FOI-LADRC against the cart-weight variation for a cart position, according to certain embodiments.
Figure 22B:
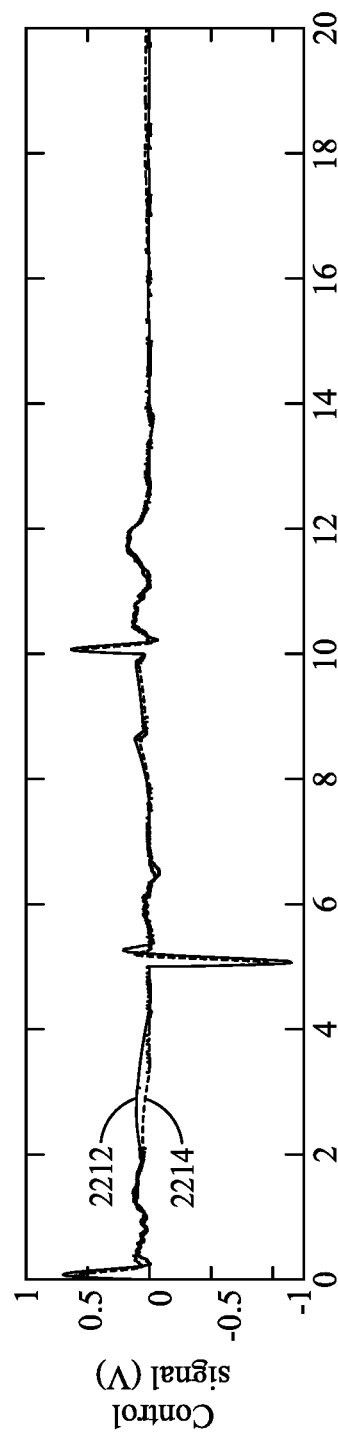
FIG. 22B is a plot illustrating a robustness of the FOI-LADRC against the cart-weight variation for a control signal, according to certain embodiments.
Figure 22C:
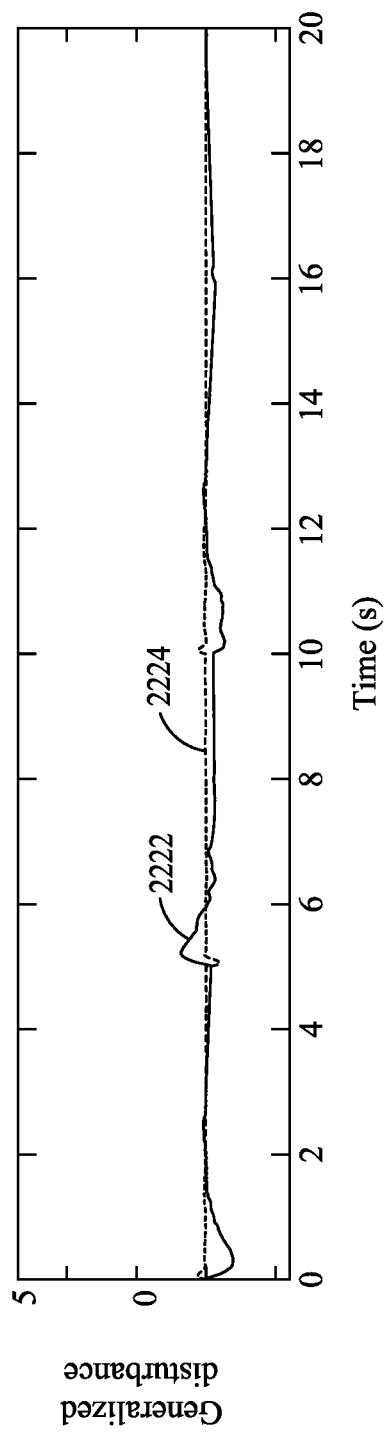
FIG. 22C is a plot illustrating a robustness of the FOI-LADRC against the cart-weight variation for a generalized disturbance, according to certain embodiments.

FIG. 22A to 22C is a plot illustrating robustness of FOI-LADRC against the gain $k_r$. FIG. 22A illustrates a cart position where a plot line 2202 is a CL step response for 2.3 kg, and a plot line 2204 is a CL step response for a 3.02 kg. FIG. 22B illustrates a control signal where a plot line 2212 is a CL step response for a 3.02 kg, and a plot line 2214 is a CL step response for a 2.3 kg. FIG. 22C illustrates a generalized disturbance signal where a plot line 2222 is a CL step response for a 3.02 kg, and a plot line 1824 is a CL step response 2.3 kg. Table 5 provides results of measurements against parameter $k_r$.

TABLE 5

FOI-LADRC scheme robustness against parameter $k_r$.

|  | First step | | | Second step | | | Third step | | |
| --- | --- | --- | --- | --- | --- | --- | --- | --- | --- |
|  | $M_p$ | $U_m$ | $f_m$ | $M_p$ | $U_m$ | $f_m$ | $M_p$ | $U_m$ | $f_m$ |
| nominal value | 1.4 | 1.13 | 3.80 | 0.8 | 1.84 | 5.30 | 0.3 | 1.10 | 3.60 |
| 0.5 × $k_r$ | 1.1 | 0.70 | 1.19 | 0.3 | 0.89 | 1.20 | 0.2 | 0.56 | 1.16 |
| 1.5 × $k_r$ | 1.7 | 1.70 | 10.42 | 1.2 | 2.50 | 26.40 | 0.3 | 1.52 | 7.80 |

FIG. 18A-18C, FIG. 20A-20C, and FIG. 22A-22C illustrate that for the three control schemes, that is the conventional LADRC system, the IOI-LADRC system and FOI-LADRC system, any change on the cart weight has no effect on the evolution of the cart position. This demonstrates that the LADRC schemes are a model free control that are not based on the controlled system parameters. Similarly, the evolution of the generalized disturbance demonstrates the LADRC schemes are a model free control that are not based on the controlled system parameters. The evolution of the generalized disturbance is different when the weight of the cart is normal and when the weight is modified. This difference is due to the influence of the cart weight on the evolution of its position. The difference is estimated by the observer and then canceled by the control law, which therefore evolves accordingly as shown in these same figures. FIG. 17A-17C, FIG. 18A-18C and FIG. 21A-21C, and the performance of the three LADRC schemes summarized in Tables (3), (4) and (5), show that the CL step response with the FOI-LADRC is almost insensitive to the variations of gain $k_r$, which is not the case with the conventional LADRC and the IOI-LADRC. This demonstrates that the use of the fractional order integral action improves the robustness of the LADRC structure.

The FOI-LADRC system provides a high relative degree using fractional order controllers and imposes flatness of the phase margin resulting in the iso-damping property. As seen, the FOI-LADRC system involves a control structure associated with a fractional order integral action coupled in the SPT loop. The FOI-LADRC system has been implemented on an experimental test bed consisting of a pendulum cart system as illustrated in FIG. 15. The experiment has demonstrated that the FOI-LADRC system can be implemented without modeling the system, and the robustness of the FOI-LADRC control scheme is better than the conventional LADRC and IOI-LADRC.

The first embodiment is illustrated with respect to FIGS. 1-22C. The first embodiment describes a FOI-LADRC method for set-point tracking of a process variable. The FOI-LADRC method for set-point tracking of a process variable includes receiving, at a first multiplier 504, a reference signal, r(t) 502, multiplying, by the first multiplier 504, the reference signal 502 by a first feedback signal 526, and generating a feedback modified reference signal, ε(t), dividing, by a set-point tracking controller 550 including a fractional order integrator 506, the feedback modified reference signal, ε(t), by a fractional order integral operator, and generating a fractional order reference signal, $Z_r(t)$ 508, amplifying, by a first amplifier 510 of the set-point tracking controller 550, the fractional order reference signal, $Z_r$ 508, by a first integrated gain, $k_r$ 510, to generate a gain modified fractional order reference signal, $Z'_r(t)$, multiplying, by a second multiplier 512, the gain modified fractional order reference signal, $Z'_r(t)$ by a series of second feedback signals and generating a modified signal, $u_0(t)$, multiplying, by a third multiplier 514, the modified signal, $u_0(t)$ by a third feedback signal 534 and generating a feedback modified signal, $u_0(t)$, dividing, by a second amplifier 516, the feedback modified signal, $u_0(t)$, by a static gain, $b_0$, and generating a process control variable, u(t) 518, inputting the process control variable, u(t) 518, to a plant 520, applying a disturbance, d 522, to the plant 520, outputting, by the plant 520, an output signal, y(t) 524, feeding back the output signal, y(t) 524, as the first feedback signal 526 to the first multiplier 504, inputting the output signal, y(t) 524, and the process control variable, u(t) 518, to an extended state observer, ESO 528, wherein the ESO 528 is configured to estimate the disturbance, d 522, generating, by the ESO 528, a series of n estimated disturbance canceling feedback signals, $Z_1(t)$, $Z_2(t)$, ... $Z_n(t)$ 530, multiplying, by a third amplifier 532, the series of n estimated disturbance canceling feedback signals 530 by a state feedback vector, $K_S$, to generate the series of second feedback signals, $K_S Z_1(t)$, $K_S Z_2(t)$, ... $K_S Z_n(t)$, generating, by the ESO 528, a third feedback signal, $Z_{n+1}(t)$, based on an estimate of the process variable, u(t), and tuning the set-point tracking controller 550 and the ESO 528 to eliminate the disturbance, d, from the output signal, y(t) 524.

The fractional order integral operator is given by $$\frac{1}{s^\alpha},$$

wherein s is a Laplace transform of the output signal, y(t), α is a non-integer order of the fractional order integrator, and where 0<α<1.

A transfer function, $G_{ry}(s)$ of a control loop from the input reference signal, r(t) to the output signal, y(t) is given by:

$$G_{ry}(s) = \frac{\frac{1}{T_{\tau_c}}}{s^{2+\alpha} + \frac{1}{T}s^{1+\alpha} + \frac{1}{T_{\tau_c}}}$$

where $\tau_c$ is a first time constant of the set-point tracking controller, and T is a second time constant of the set-point tracking controller, where $T < \tau_c$.

A transfer function, $G_{fy}(s)$ of a control loop from the disturbance signal, d(t) to the output signal, y(t) is given by:

$$G_{fy}(s) = \frac{s^{\alpha+1}\left(s^2 + \left(3\omega_0 + \frac{1}{T}\right)s\right) + \left(3\omega_0^2 + 3\omega_0\frac{1}{T}\right)}{(s+\omega_0)^3\left(s^{2+\alpha} + \frac{1}{T}s^{1+\alpha} + \frac{1}{T_{\tau_c}}\right)}$$

where $\tau_c$ is a first time constant of the set-point tracking controller, T is a second time constant of the set-point tracking controller, where $T < \tau_c$, and wo is a crossover frequency of the ESO.

The FOI-LADRC method further includes determining the non-integer order, α, of the fractional order integrator by imposing an iso-damping property on a closed loop response.

The FOI-LADRC method further includes imposing the iso-damping property on the closed loop response by setting a Bode ideal transfer function as a reference model to the ESO, wherein the Bode ideal transfer function is given by, $$G_{cl}(s) = \frac{1}{(1+Ts)^{n-1}\tau_c s^{\lambda+1} + 1}$$

where n represents an $n^{th}$ derivative of y(t), is the crossover frequency of the SPT, $\tau_c$ is a first time constant of the set-point tracking controller, and T is a second time constant of the set-point tracking controller, where $T < \tau_c$, setting λ=α, $(k_s n-1)/k_r = \tau_c$ and $k_r = 1/(T^{n-1}\tau_c)$, and generating the closed loop transfer function, $G_{ry}(s)$ of a control loop from the input reference signal, r(t) to the output signal, y(t), wherein $G_{ry}(s)$ is given by:

$$G_{ry}(s) = \frac{\frac{1}{T\tau_c}}{s^{2+\alpha} + \frac{1}{T}s^{1+\alpha} + \frac{1}{T\tau_c}}.$$

The FOI-LADRC method further includes tuning the set-point tracking controller and the ESO by selecting values for $\alpha$, $\tau_c$, and T.

The FOI-LADRC method further includes generating, by the fractional order controller, control signals for a DC motor of the plant, wherein the control signals are configured to move a cart along a track, and compensating for the disturbance, d, wherein the disturbance is generated by swinging pendulums attached to the cart, by applying the first, second and third feedback signals to the control signals.

The second embodiment is illustrated with respect to FIGS. 1-22C. The second embodiment describes a set point tracking system 550 with fractional order integral linear active disturbance rejection control. The set point tracking system with fractional order integral linear active disturbance rejection control includes a first multiplier 504 having an input configured to receive a reference signal, r(t) 502 and a first negative feedback signal 526 and generate a feedback modified reference signal, ε(t), a set point tracking controller 550 connected to the first multiplier 504, the set point tracking controller 550 includes a first circuitry and a first processor having first program instructions to perform fractional order integration by applying a fractional order integral operator to the feedback modified reference signal, ε(t), to generate a fractional order reference signal, $Z_r(t)$, a first amplifier 510 configured to amplify the fractional order reference signal, $Z_r$, by a first integrated gain, $k_r$, to generate a gain modified fractional order reference signal, $Z'_r(t)$, a second multiplier 512 connected to the set-point tracking controller, the second multiplier 512 configured to multiply the gain modified fractional order reference signal, $Z'_r(t)$ by a series of second negative feedback signals to generate a modified signal, $u'_0(t)$, a third multiplier 514 connected to the second multiplier 512, the third multiplier 514 configured to multiple the modified signal, $u'_0(t)$, by a third negative feedback signal 534 to generate a feedback modified signal, $u_0(t)$, a second amplifier 516 connected to the third multiplier 514, the second amplifier 516 configured to divide the feedback modified signal, $u_0(t)$ by a static gain, $b_0$, to generate a process control variable, u(t) 518, a plant 520 connected to the second amplifier 516, the plant 520 having a first input configured to receive the process control variable, u(t) 518, a second input configured to receive a disturbance, d, 522 and an output configured to generate an output signal, y(t) 524, an extended state observer, ESO 528, controller having a first input connected to the output signal, y(t) 524, and a second input connected to the process variable, u(t) 518, the ESO controller 528 includes second circuitry and a second processor having second program instructions configured to estimate the disturbance, d, generate a series of n estimated disturbance canceling feedback signals, $Z_1(t), Z_2(t), \ldots Z_n(t)$ 530, generate a third negative feedback signal, $Z_{n+1}(t)$ 534, based on an estimate of the process variable, u(t) 518, a third amplifier 532 having an input connected to receive the series of n estimated disturbance canceling feedback signals, $Z_1(t), Z_2(t), \ldots Z_n(t)$ and multiply the series of n estimated disturbance canceling feedback signals, $Z_1(t), Z_2(t), \ldots Z_n(t)$ by a state feedback vector, $K_S$, to generate the series of second negative feedback signals, $K_S Z_1(t), K_S Z_2(t), \ldots K_S Z_n(t)$, a first control input configured for tuning the set-point tracking controller 550, and a second control input configured for tuning the ESO 528, wherein tuning the set-point tracking controller 550 and the ESO 528 is configured to eliminate the disturbance, d 522, from the output signal, y(t) 524.

The fractional order integral operator is given by $$\frac{1}{s^\alpha},$$

wherein s is a Laplace transform of the output signal, y(t), a is a non-integer order of the fractional order integrator, where $0<\alpha<1$.

A transfer function, $G_{ry}(s)$ of a closed loop response from the input of the first multiplier to the output, y(t) is given by:

$$G_{ry}(s) = \frac{\frac{1}{T\tau_c}}{s^{2+\alpha} + \frac{1}{T}s^{1+\alpha} + \frac{1}{T\tau_c}}$$

where $\tau_c$ is a first time constant of the set-point tracking controller, and T is a second time constant of the set-point tracking controller, where $T<\tau_c$, wherein the first control input is configured for receiving selected values for $\alpha$, $\tau_c$, and T to tune the set point tracking controller, and wherein the second control input is configured to receive a selected value of an ESO crossover frequency bandwidth, $\omega_0$, to tune a gain vector of the ESO.

The transfer function, $G_{fy}(s)$ of a control loop from the disturbance signal, d(t) to the output signal, y(t) 524 is given by:

$$G_{fy}(s) = \frac{s^{\alpha+1}\left(s^2 + \left(3\omega_0 + \frac{1}{T}\right)s\right) + \left(3\omega_0^2 + 3\omega_0\frac{1}{T}\right)}{(s+\omega_0)^3\left(s^{2+\alpha} + \frac{1}{T}s^{1+\alpha} + \frac{1}{T\tau_c}\right)}$$

where $\tau_c$ is a first time constant of the set-point tracking controller, T is a second time constant of the set-point tracking controller, where $T<\tau_c$, and $\omega_0$ is a crossover frequency bandwidth of the ESO 528, wherein the first control input is configured to receive selected values for $\alpha$, $\tau_c$, and T, to tune the set point tracking controller, and wherein the second control input is configured to receive a selected value of an ESO crossover frequency bandwidth, $\omega_0$, to tune a gain of the ESO.

The first program instructions of the first processor are configured to determine the non-integer order, $\alpha$, of the fractional order integrator by imposing an iso-damping property on a closed loop response.

The first program instructions of the first processor are configured to impose the iso-damping property on the closed loop response by: setting a Bode ideal transfer function as a reference model to the ESO, wherein the Bode ideal transfer function is given by, $$G_{cl}(s) = \frac{1}{(1+Ts)^{n-1}\tau_c s^{\lambda+1} + 1}$$

where n represents an $n^{th}$ derivative of y(t), is the crossover frequency of the SPT, $\tau_c$ is a first time constant of the set-point tracking controller, and T is a second time constant of the set-point tracking controller, where T<$\tau_c$, setting $\lambda$=$\alpha$, $(k_s n-1)/k_r=\tau_c$ and $k_r=1/(T^{n-1} \tau_c)$, and generating the closed loop transfer function, $G_{ry}(s)$ of a control loop from the input reference signal, r(t) to the output signal, y(t), wherein $G_{ry}(s)$ is given by:

$$G_{ry}(s) = \frac{\frac{1}{T\tau_c}}{s^{2+\alpha} + \frac{1}{T}s^{1+\alpha} + \frac{1}{T\tau_c}}$$

The plant 522 includes a cart having a first side and a second side, a track configured to confine the cart to linear movement, a first pendulum arm connected to the first side, a second pendulum arm connected to the second side, wherein the first pendulum arm and second pendulum are configured to generate the disturbance, d, in the linear movement by swinging when the cart is moved, a belt connected to the cart, a DC motor connected to the belt, the DC motor configured to pull the belt such that the cart moves along the track, wherein the set point tracking controller is configured to generate control signals for the DC motor, wherein the control signals are configured to move the cart along the track with minimum disturbance. The set point tracking system wherein a transfer function, $G_{ry}(s)$ of a closed loop response from the input of the first multiplier to the output, y(t) is given by:

$$G_{ry}(s) = \frac{\frac{1}{T\tau_c}}{s^{2+\alpha} + \frac{1}{T}s^{1+\alpha} + \frac{1}{T\tau_c}}$$

where $\alpha$ is a non-integer order of the fractional order integrator, $\tau_c$ is a first time constant of the set-point tracking controller, and T is a second time constant of the set-point tracking controller, where T<$\tau_c$, wherein the first control input is configured for receiving selected values for $\alpha$, $\tau_c$, and T to tune the set point tracking controller, and wherein the second control input is configured to receive a selected value of an ESO crossover frequency bandwidth, $\omega_0$, to tune a gain vector of the ESO, wherein tuning the set point tracking controller and the ESO eliminates the disturbance, d, in the movement of the cart generated by the swinging of the first and second pendulums.

A transfer function, $G_{fy}(s)$ of a control loop from the disturbance signal, f=d(t), to the output signal, y(t), is given by:

$$G_{fy}(s) = \frac{s^{\alpha+1}\left(s^2 + \left(3\omega_0 + \frac{1}{T}\right)s\right) + \left(3\omega_0^2 + 3\omega_0 \frac{1}{T}\right)}{(s+\omega_0)^3\left(s^{2+\alpha} + \frac{1}{T}s^{1+\alpha} + \frac{1}{T\tau_c}\right)}$$

where $\tau_c$ is a first time constant of the set-point tracking controller, T is a second time constant of the set-point tracking controller, where T<$\tau_c$, and where $\omega_0$ is a crossover frequency bandwidth of the ESO, wherein the first control input is configured to receive selected values for $\alpha$, $\tau_c$, and T, to tune the set point tracking controller, and wherein the second control input is configured to receive a selected value of an ESO crossover frequency bandwidth, $\omega_0$, to tune a gain of the ESO.

The third embodiment is illustrated with respect to FIGS. 1-22C. The third embodiment describes a fractional order integral linear active disturbance rejection control method for set-point tracking of a process variable. The fractional order integral linear active disturbance rejection control method for set-point tracking of a process variable includes receiving, at a first multiplier 504, a reference signal 502, multiplying the reference signal by a first feedback signal, applying, by a set-point tracking controller 550, fractional order integration to the reference signal, amplifying the reference signal, multiplying the reference signal by a series of second feedback signals and a third feedback signal, dividing the reference signal by a static gain, $b_0$, and generating a process control variable, u(t), inputting the process control variable, u(t) 518, to a plant 520, applying a disturbance, d 522, to the plant 520, outputting, by the plant 520, an output signal, y(t) 524, feeding back the output signal, y(t) 524, as the first feedback signal, generating the series of second feedback signals and a third feedback signal by an extended state observer, and tuning the set-point tracking controller and the ESO to eliminate the disturbance, d 522, from the output signal, y(t) 524.

The fractional order integral linear active disturbance rejection control method further includes applying the fractional order integration by a fractional order integral operator given by $$\frac{1}{s^\alpha},$$

wherein s is a Laplace transform of the output signal, y(t), $\alpha$ is a non-integer order of the fractional order integrator, and where 0<$\alpha$<1.

A transfer function, $G_{ry}(s)$ of a control loop from the input reference signal, r(t) to the output signal, y(t) is given by:

$$G_{ry}(s) = \frac{\frac{1}{T\tau_c}}{s^{2+\alpha} + \frac{1}{T}s^{1+\alpha} + \frac{1}{T\tau_c}}$$

where $\tau_c$ is a first time constant of the set-point tracking controller, and T is a second time constant of the set-point tracking controller, where T<$\tau_c$.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A fractional order integral linear active disturbance rejection control (FOI-LADRC) method for set-point tracking of a process variable, comprising:
  receiving, at a first multiplier, a reference signal, r(t);
  multiplying, by the first multiplier, the reference signal by a first feedback signal and generating a feedback modified reference signal, $\varepsilon$(t);
  dividing, by a set-point tracking controller including a fractional order integrator, the feedback modified reference signal, ε(t), by a fractional order integral operator, and generating a fractional order reference signal, $Z_r(t)$;

amplifying, by a first amplifier of the set-point tracking controller, the fractional order reference signal, $Z_r$, by a first integrated gain, $k_r$, to generate a gain modified fractional order reference signal, $Z'_r(t)$;

multiplying, by a second multiplier, the gain modified fractional order reference signal, $Z'_r(t)$ by a series of second feedback signals and generating a modified signal, $u_0(t)$;

multiplying, by a third multiplier, the modified signal, $u_0(t)$ by a third feedback signal and generating a feedback modified signal, $u'_0(t)$;

dividing, by a second amplifier, the feedback modified signal, $u'_0(t)$, by a static gain, $b_0$, and generating a process control variable, $u(t)$;

inputting the process control variable, $u(t)$, to a plant;

applying a disturbance, d, to the plant;

outputting, by the plant, an output signal, $y(t)$;

feeding back the output signal, $y(t)$, as the first feedback signal to the first multiplier;

inputting the output signal, $y(t)$, and the process control variable, $u(t)$, to an extended state observer, ESO, wherein the ESO is configured to estimate the disturbance, d;

generating, by the ESO, a series of n estimated disturbance canceling feedback signals, $Z_1(t), Z_2(t), \ldots Z_n(t)$;

multiplying, by a third amplifier, the series of n estimated disturbance canceling feedback signals by a state feedback vector, $K_S$, to generate the series of second feedback signals, $K_S Z_1(t), K_S Z_2(t), \ldots K_S Z_n(t)$;

generating, by the ESO, a third feedback signal, $Z_{n+1}(t)$, based on an estimate of the process variable, $u(t)$; and tuning the set-point tracking controller and the ESO to eliminate the disturbance, d, from the output signal, $y(t)$.

2. The fractional order integral linear active disturbance rejection control (FOI-LADRC) method of claim 1, wherein the fractional order integral operator is given by $$\frac{1}{s^\alpha},$$

wherein s is a Laplace transform of the output signal, $y(t)$, α is a non-integer order of the fractional order integrator, and where $0<\alpha<1$.

3. The fractional order integral linear active disturbance rejection control (FOI-LADRC) method of claim 2, wherein a transfer function, $G_{ry}(s)$ of a control loop from the input reference signal, r(t) to the output signal, y(t) is given by:

$$G_{ry}(s) = \frac{\frac{1}{T\tau_c}}{s^{2+\alpha} + \frac{1}{T}s^{1+\alpha} + \frac{1}{T\tau_c}}$$

where $\tau_c$ is a first time constant of the set-point tracking controller, and T is a second time constant of the set-point tracking controller, where $T<\tau_c$.

4. The fractional order integral linear active disturbance rejection control (FOI-LADRC) method of claim 2, wherein a transfer function, $G_{fy}(s)$ of a control loop from the disturbance signal, d(t) to the output signal, y(t) is given by:

$$G_{fy}(s) = \frac{s^{\alpha+1}\left(s^2 + \left(3\omega_0 + \frac{1}{T}\right)s\right) + \left(3\omega_0^2 + 3\omega_0\frac{1}{T}\right)}{(s+\omega_0)^3\left(s^{2+\alpha} + \frac{1}{T}s^{1+\alpha} + \frac{1}{T\tau_c}\right)}$$

where $\tau_c$ is a first time constant of the set-point tracking controller, Tis a second time constant of the set-point tracking controller, where $T<\tau_c$, and wo is a crossover frequency of the ESO.

5. The fractional order integral linear active disturbance rejection control (FOI-LADRC) method of claim 2, further comprising:

determining the non-integer order, α, of the fractional order integrator by imposing an iso-damping property on a closed loop response.

6. The fractional order integral linear active disturbance rejection control (FOI-LADRC) method of claim 5, further comprising:

imposing the iso-damping property on the closed loop response by:
setting a Bode ideal transfer function as a reference model to the ESO, wherein the Bode ideal transfer function is given by;

$$G_{cl}(s) = \frac{1}{(1+Ts)^{n-1}\tau_c s^{\lambda+1} + 1}$$

where n represents an $n^{th}$ derivative of y(t), is the crossover frequency of the SPT, $\tau_c$ is a first time constant of the set-point tracking controller, and T is a second time constant of the set-point tracking controller, where $T<\tau_c$;

setting $\lambda=\alpha$, $(k_S n-1)/k_r=\tau_c$ and $k_r=1/(T^{n-1}\tau_c)$; and generating the closed loop transfer function, $G_{ry}(s)$ of a control loop from the input reference signal, r(t) to the output signal, y(t), wherein $G_{ry}(s)$ is given by:

$$G_{ry}(s) = \frac{\frac{1}{T\tau_c}}{s^{2+\alpha} + \frac{1}{T}s^{1+\alpha} + \frac{1}{T\tau_c}}.$$

7. The fractional order integral linear active disturbance rejection control (FOI-LADRC) method of claim 6, further comprising:

tuning the set-point tracking controller and the ESO by selecting values for α, $\tau_c$, and T.

8. The fractional order integral linear active disturbance rejection control (FOI-LADRC) method of claim 2, further comprising:

generating, by the fractional order controller, control signals for a DC motor of the plant, wherein the control signals are configured to move a cart along a track; and compensating for the disturbance, d, wherein the disturbance is generated by swinging pendulums attached to the cart, by applying the first, second and third feedback signals to the control signals.

9. A set point tracking system with fractional order integral linear active disturbance rejection control, comprising:
- a first multiplier having an input configured to receive a reference signal, r(t) and a first negative feedback signal and generate a feedback modified reference signal, $\varepsilon(t)$;
- a set point tracking controller connected to the first multiplier, the set point tracking controller including:
  - a first circuitry and a first processor having first program instructions to perform fractional order integration by applying a fractional order integral operator to the feedback modified reference signal, $\varepsilon(t)$, to generate a fractional order reference signal, $Z_r(t)$;
  - a first amplifier configured to amplify the fractional order reference signal, $Z_r$, by a first integrated gain, $k_r$, to generate a gain modified fractional order reference signal, $Z'_r(t)$;
- a second multiplier connected to the set point tracking controller, the second multiplier configured to multiply the gain modified fractional order reference signal, $Z'_r(t)$ by a series of second negative feedback signals to generate a modified signal, $u'_0(t)$; and
- a third multiplier connected to the second multiplier, the third multiplier configured to multiple the modified signal, $u'_0(t)$, by a third negative feedback signal to generate a feedback modified signal, $u_0(t)$;
- a second amplifier connected to the third multiplier, the second amplifier configured to divide the feedback modified signal, $u_0(t)$ by a static gain, $b_0$, to generate a process control variable, u(t);
- a plant connected to the second amplifier, the plant having a first input configured to receive the process control variable, u(t), a second input configured to receive a disturbance, d; and an output configured to generate an output signal, y(t);
- an extended state observer, ESO, controller having a first input connected to the output signal, y(t), and a second input connected to the process variable, u(t), wherein the ESO controller includes second circuitry and a second processor having second program instructions configured to:
  - estimate the disturbance, d;
  - generate a series of n estimated disturbance canceling feedback signals, $Z_1(t), Z_2(t), \ldots Z_n(t)$;
  - generate a third negative feedback signal, $Z_{n+1}(t)$, based on an estimate of the process variable, u(t);
- a third amplifier having an input connected to receive the series of n estimated disturbance canceling feedback signals, $Z_1(t), Z_2(t), \ldots Z_n(t)$ and multiply the series of n estimated disturbance canceling feedback signals, $Z_1(t), Z_2(t), \ldots Z_n(t)$ by a state feedback vector, $K_S$, to generate the series of second negative feedback signals, $K_S Z_1(t), K_S Z_2(t), \ldots K_S Z_n(t)$;
- a first control input configured for tuning the set-point tracking controller;
- a second control input configured for tuning the ESO, wherein tuning the set-point tracking controller and the ESO is configured to eliminate the disturbance, d, from the output signal, y(t).

10. The set point tracking system of claim 9, wherein the fractional order integral operator is given by $$\frac{1}{s^\alpha},$$

wherein s is a Laplace transform of the output signal, y(t), $\alpha$ is a non-integer order of the fractional order integrator, where $0<\alpha<1$.

11. The set point tracking system of claim 10, wherein a transfer function, $G_{ry}(s)$ of a closed loop response from the input of the first multiplier to the output, y(t) is given by:

$$G_{ry}(s) = \frac{\frac{1}{T\tau_c}}{s^{2+\alpha} + \frac{1}{T}s^{1+\alpha} + \frac{1}{T\tau_c}}$$

where $\tau_c$ is a first time constant of the set-point tracking controller, and T is a second time constant of the set-point tracking controller, where $T<\tau_c$;
  wherein the first control input is configured for receiving selected values for $\alpha$, $\tau_c$, and T to tune the set point tracking controller; and
  wherein the second control input is configured to receive a selected value of an ESO crossover frequency bandwidth, $\omega_0$, to tune a gain vector of the ESO.

12. The set point tracking system of claim 10,
wherein a transfer function, $G_{fy}(s)$ of a control loop from the disturbance signal, d(t) to the output signal, y(t) is given by:

$$G_{fy}(s) = \frac{s^{\alpha+1}\left(s^2 + \left(3\omega_0 + \frac{1}{T}\right)s\right) + \left(3\omega_0^2 + 3\omega_0\frac{1}{T}\right)}{(s+\omega_0)^3\left(s^{2+\alpha} + \frac{1}{T}s^{1+\alpha} + \frac{1}{T\tau_c}\right)}$$

where $\tau_c$ is a first time constant of the set-point tracking controller, T is a second time constant of the set-point tracking controller, where $T<\tau_c$, and $\omega_0$ is a crossover frequency bandwidth of the ESO;
  wherein the first control input is configured to receive selected values for $\alpha$, $\tau_c$, and T, to tune the set point tracking controller; and
  wherein the second control input is configured to receive a selected value of an ESO crossover frequency bandwidth, $\omega_0$, to tune a gain of the ESO.

13. The set point tracking system of claim 10, wherein the first program instructions of the first processor are configured to determine the non-integer order, $\alpha$, of the fractional order integrator by imposing an iso-damping property on a closed loop response.

14. The set point tracking system of claim 13, wherein the first program instructions of the first processor are configured to impose the iso-damping property on the closed loop response by:
  setting a Bode ideal transfer function as a reference model to the ESO, wherein the Bode ideal transfer function is given by;

$$G_{cl}(s) = \frac{1}{(1+Ts)^{n-1}\tau_c s^{\lambda+1}+1}$$

where n represents an $n^{th}$ derivative of y(t), is the crossover frequency of the SPT, $\tau_c$ is a first time constant of the set-point tracking controller, and T is a second time constant of the set-point tracking controller, where $T<\tau_c$;

setting $\lambda=\alpha$, $(k_S n-1)/k_r = \tau_c$ and $k_r = 1/(T^{n-1}\tau_c)$; and generating the closed loop transfer function, $G_{ry}(s)$ of a control loop from the input reference signal, r(t) to the output signal, y(t), wherein $G_{ry}(s)$ is given by:

$$G_{ry}(s) = \frac{\frac{1}{T_{\tau_c}}}{s^{2+\alpha} + \frac{1}{T}s^{1+\alpha} + \frac{1}{T_{\tau_c}}}.$$

15. The set point tracking system of claim 9, wherein the plant comprises:
   a cart having a first side and a second side;
   a track configured to confine the cart to linear movement;
   a first pendulum arm connected to the first side;
   a second pendulum arm connected to the second side, wherein the first pendulum arm and second pendulum are configured to generate the disturbance, d, in the linear movement by swinging when the cart is moved;
   a belt connected to the cart;
   a DC motor connected to the belt, the DC motor configured to pull the belt such that the cart moves along the track;
   wherein the set point tracking controller is configured to generate control signals for the DC motor, wherein the control signals are configured to move the cart along the track with minimum disturbance.

16. The set point tracking system of claim 15, further comprising:
   wherein a transfer function, $G_{ry}(s)$ of a closed loop response from the input of the first multiplier to the output, y(t) is given by:

$$G_{ry}(s) = \frac{\frac{1}{T_{\tau_c}}}{s^{2+\alpha} + \frac{1}{T}s^{1+\alpha} + \frac{1}{T_{\tau_c}}}$$

where $\alpha$ is a non-integer order of the fractional order integrator, $\tau_c$, is a first time constant of the set-point tracking controller, and T is a second time constant of the set-point tracking controller, where $T<\tau_c$;
   wherein the first control input is configured for receiving selected values for $\alpha$, $\tau_c$, and T to tune the set point tracking controller; and
   wherein the second control input is configured to receive a selected value of an ESO crossover frequency bandwidth, $\omega_0$, to tune a gain vector of the ESO, wherein tuning the set point tracking controller and the ESO eliminates the disturbance, d, in the movement of the cart generated by the swinging of the first and second pendulums.

17. The set point tracking system of claim 15,
   wherein a transfer function, $G_{fy}(s)$ of a control loop from the disturbance signal, f=d(t), to the output signal, y(t), is given by:

$$G_{fy}(s) = \frac{s^{\alpha+1}\left(s^2 + \left(3\omega_0 + \frac{1}{T}\right)s\right) + \left(3\omega_0^2 + 3\omega_0\frac{1}{T}\right)}{(s+\omega_0)^3\left(s^{2+\alpha} + \frac{1}{T}s^{1+\alpha} + \frac{1}{T_{\tau_c}}\right)}$$

where $\tau_c$ is a first time constant of the set-point tracking controller, T is a second time constant of the set-point tracking controller, where $T<\tau_c$, and where $\omega_0$ is a crossover frequency bandwidth of the ESO;
   wherein the first control input is configured to receive selected values for $\alpha$, $\tau_c$, and T, to tune the set point tracking controller; and
   wherein the second control input is configured to receive a selected value of an ESO crossover frequency bandwidth, $\omega_0$, to tune a gain of the ESO.

18. A fractional order integral linear active disturbance rejection control method for set-point tracking of a process variable, comprising:
   receiving, at a first multiplier, a reference signal;
   multiplying the reference signal by a first feedback signal;
   applying, by a set-point tracking controller, fractional order integration to the reference signal;
   amplifying the reference signal;
   multiplying the reference signal by a series of second feedback signals and a third feedback signal;
   dividing the reference signal by a static gain, $b_0$, and generating a process control variable, u(t);
   inputting the process control variable, u(t), to a plant;
   applying a disturbance, d, to the plant;
   outputting, by the plant, an output signal, y(t);
   feeding back the output signal, y(t), as the first feedback signal;
   generating the series of second feedback signals and a third feedback signal by an extended state observer; and
   tuning the set-point tracking controller and the ESO to eliminate the disturbance, d, from the output signal, y(t).

19. The fractional order integral linear active disturbance rejection control method of claim 18, further comprising:
   applying the fractional order integration by a fractional order integral operator given by $$\frac{1}{s^\alpha},$$

wherein s is a Laplace transform of the output signal, y(t), $\alpha$ is a non-integer order of the fractional order integrator, and where $0<\alpha<1$.

20. The fractional order integral linear active disturbance rejection control method of claim 19, wherein a transfer function, $G_{ry}(s)$ of a control loop from the input reference signal, r(t) to the output signal, y(t) is given by:

$$G_{ry}(s) = \frac{\frac{1}{T_{\tau_c}}}{s^{2+\alpha} + \frac{1}{T}s^{1+\alpha} + \frac{1}{T_{\tau_c}}}$$

where $\tau_c$ is a first time constant of the set-point tracking controller, and T is a second time constant of the set-point tracking controller, where $T<\tau_c$.

* * * * *